US012372363B2

United States Patent
Kakosyan et al.

(10) Patent No.: US 12,372,363 B2
(45) Date of Patent: Jul. 29, 2025

(54) METHOD AND SYSTEM TO SHARE DATA ACROSS NETWORK OPERATORS TO SUPPORT WIRELESS QUALITY OF SERVICE (QOS) FOR CONNECTED VEHICLES

(71) Applicant: Telefonaktiebolaget LM Ericsson (publ), Stockholm (SE)

(72) Inventors: Garnik Kakosyan, Plano, TX (US); Utsav Agarwal, Issaquah, WA (US); Alejandro Gil Castellanos, Snoqualmie, WA (US); Kalyana Chakravarthy Bedhu, McKinney, TX (US); Shruti Bothe, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 17/996,216

(22) PCT Filed: Jul. 1, 2020

(86) PCT No.: PCT/IB2020/056207
§ 371 (c)(1),
(2) Date: Oct. 13, 2022

(87) PCT Pub. No.: WO2021/209803
PCT Pub. Date: Oct. 21, 2021

(65) Prior Publication Data
US 2023/0194277 A1 Jun. 22, 2023

Related U.S. Application Data

(60) Provisional application No. 63/012,042, filed on Apr. 17, 2020.

(51) Int. Cl.
*G01C 21/00* (2006.01)
*B60W 60/00* (2020.01)
(Continued)

(52) U.S. Cl.
CPC ....... *G01C 21/3461* (2013.01); *B60W 60/001* (2020.02); *H04L 41/40* (2022.05);
(Continued)

(58) Field of Classification Search
CPC ...... G01C 21/3461; H04W 4/44; H04W 4/40; H04W 24/08; H04W 24/10; B60W 60/001; H04L 41/40
See application file for complete search history.

(56) References Cited

U.S. PATENT DOCUMENTS 5,610,821 A 3/1997 Gazis et al.
8,676,502 B2 3/2014 Petersen
(Continued)

FOREIGN PATENT DOCUMENTS

EP 3883149 A1 9/2021
WO 01/69570 A2 9/2001
(Continued)

OTHER PUBLICATIONS

International Preliminary Report on Patentability, App. No. PCT/IB2020/056205, Oct. 27, 2022, 12 pages.
(Continued)

*Primary Examiner* — Khai M Nguyen
(74) *Attorney, Agent, or Firm* — Nicholson De Vos Webster & Elliott LLP

(57) ABSTRACT

A method provides route information to a connected vehicle in a brokered information prediction system. The method includes determining available mobile communication networks that can provide real-time mobile communication network data, querying a first available mobile communi-
(Continued)

cation network to provide key performance indicators for a route for a connected vehicle, determining service level indicators for the route based on received key performance indicators for the route where the key performance indicators meet defined thresholds, and sending predicted service level indicators for the route to the connected vehicle.

20 Claims, 20 Drawing Sheets

(51) Int. Cl.
  *G01C 21/34* (2006.01)
  *H04L 41/40* (2022.01)
  *H04W 4/40* (2018.01)
  *H04W 4/44* (2018.01)
  *H04W 24/08* (2009.01)
  *H04W 24/10* (2009.01)

(52) U.S. Cl.
  CPC .............. *H04W 4/40* (2018.02); *H04W 4/44* (2018.02); *H04W 24/08* (2013.01); *H04W 24/10* (2013.01)

(56) References Cited

U.S. PATENT DOCUMENTS

| | | |
|---|---|---|
| 9,432,961 B2 | 8/2016 | Rao et al. |
| 9,746,341 B2 | 8/2017 | Sheha et al. |
| 9,846,049 B2 | 12/2017 | Krumm |
| 9,881,022 B2 | 1/2018 | Ubhi et al. |
| 10,339,810 B2 | 7/2019 | Akiyama et al. |
| 10,581,664 B1 | 3/2020 | Peng et al. |
| 10,746,558 B2 | 8/2020 | Muldoon et al. |
| 10,952,081 B2 | 3/2021 | Peroulas et al. |
| 10,970,746 B2 | 4/2021 | Singhal et al. |
| 11,441,916 B1 | 9/2022 | Konrardy et al. |
| 2001/0034588 A1 | 10/2001 | Agrawals et al. |
| 2004/0218582 A1 | 11/2004 | Kennedy et al. |
| 2007/0088709 A1 | 4/2007 | Bailey et al. |
| 2007/0112504 A1 | 5/2007 | Krause et al. |
| 2007/0213925 A1* | 9/2007 | Sharma .................. H04W 4/02 455/456.1 |
| 2009/0080336 A1 | 3/2009 | Zhang et al. |
| 2009/0247186 A1 | 10/2009 | Ji et al. |
| 2010/0182316 A1 | 7/2010 | Akbari et al. |
| 2011/0096675 A1 | 4/2011 | Li et al. |
| 2011/0137551 A1 | 6/2011 | Peri |
| 2012/0130938 A1 | 5/2012 | Tamano |
| 2013/0308470 A1 | 11/2013 | Bevan et al. |
| 2014/0067257 A1 | 3/2014 | Dave et al. |
| 2014/0141743 A1 | 5/2014 | Shaw |
| 2014/0257695 A1 | 9/2014 | Annapureddy et al. |
| 2015/0146514 A1 | 5/2015 | Mahimkar et al. |
| 2015/0332155 A1 | 11/2015 | Mermoud et al. |
| 2017/0086049 A1 | 3/2017 | Vrzic |
| 2017/0208560 A1 | 7/2017 | Papa et al. |
| 2017/0215094 A1 | 7/2017 | Akoum et al. |
| 2017/0219359 A1 | 8/2017 | Elhoushi et al. |
| 2017/0272972 A1* | 9/2017 | Egner ................. H04L 47/2441 |
| 2018/0107216 A1 | 4/2018 | Beaurepaire et al. |
| 2018/0219753 A1 | 8/2018 | Arsenie et al. |
| 2018/0372501 A1 | 12/2018 | Sahlholm |
| 2019/0036630 A1 | 1/2019 | Svennebring et al. |
| 2019/0044830 A1 | 2/2019 | Kersch et al. |
| 2019/0045378 A1 | 2/2019 | Rosales et al. |
| 2019/0049259 A1 | 2/2019 | Galan-Oliveras et al. |
| 2019/0208001 A1 | 7/2019 | Stumbo |
| 2019/0234750 A1 | 8/2019 | Muldoon et al. |
| 2019/0239086 A1 | 8/2019 | Shekalim et al. |
| 2019/0319868 A1* | 10/2019 | Svennebring ......... H04W 24/08 |
| 2019/0383624 A1 | 12/2019 | Magzimof et al. |
| 2020/0045687 A1* | 2/2020 | Lee .................... G01C 21/26 |
| 2020/0064140 A1 | 2/2020 | Tarkiainen et al. |
| 2020/0067793 A1 | 2/2020 | Dribinski et al. |
| 2020/0107212 A1 | 4/2020 | Zielinski et al. |
| 2020/0112899 A1 | 4/2020 | Mysore et al. |
| 2020/0116515 A1 | 4/2020 | Chadha et al. |
| 2020/0162990 A1 | 5/2020 | Reimann et al. |
| 2020/0221314 A1 | 7/2020 | Cho et al. |
| 2020/0252310 A1 | 8/2020 | Thampy et al. |
| 2020/0264003 A1* | 8/2020 | Ebner ................ G01C 21/3822 |
| 2020/0311118 A1 | 10/2020 | Gupta et al. |
| 2020/0314684 A1 | 10/2020 | Reimann et al. |
| 2021/0014755 A1 | 1/2021 | Caceres et al. |
| 2021/0112423 A1 | 4/2021 | Maheshwari et al. |
| 2021/0114616 A1 | 4/2021 | Altman |
| 2021/0117869 A1 | 4/2021 | Plumbley et al. |
| 2021/0158260 A1 | 5/2021 | Kolar et al. |
| 2021/0231447 A1 | 7/2021 | Ahmed et al. |
| 2021/0306887 A1 | 9/2021 | Kim et al. |
| 2021/0337432 A1 | 10/2021 | Lee et al. |
| 2021/0345129 A1 | 11/2021 | Gupta et al. |
| 2022/0014449 A1 | 1/2022 | Mwanje et al. |
| 2022/0029896 A1 | 1/2022 | Mwanje et al. |
| 2022/0164765 A1 | 5/2022 | Masche-Pakkala et al. |
| 2022/0196426 A1 | 6/2022 | Xu et al. |
| 2023/0194277 A1 | 6/2023 | Kakosyan et al. |
| 2023/0194278 A1 | 6/2023 | Kakosyan et al. |
| 2023/0194279 A1 | 6/2023 | Kakosyan et al. |

FOREIGN PATENT DOCUMENTS

| | | | |
|---|---|---|---|
| WO | WO-2016150494 A1 * | 9/2016 | ............ H04W 4/024 |
| WO | 2018/189576 A1 | 10/2018 | |
| WO | 2021/024032 A1 | 2/2021 | |
| WO | 2021/031099 A1 | 2/2021 | |
| WO | 2021/031100 A1 | 2/2021 | |
| WO | 2021/031101 A1 | 2/2021 | |
| WO | 2021/209803 A1 | 10/2021 | |
| WO | 2021209801 A1 | 10/2021 | |
| WO | 2021209802 A1 | 10/2021 | |

OTHER PUBLICATIONS

International Preliminary Report on Patentability, App. No. PCT/IB2020/056206, Oct. 27, 2022, 9 pages.
International Preliminary Report on Patentability, App. No. PCT/IB2020/056207, Oct. 27, 2022, 9 pages.
International Search Report and Written Opinion, App. No. PCT/IB2020/056205, Jan. 19, 2021, 16 pages.
International Search Report and Written Opinion, App. No. PCT/IB2020/056206, Jan. 13, 2021, 12 pages.
International Search Report and Written Opinion, App. No. PCT/IB2020/056207, Jan. 14, 2021, 13 pages.
SAE International, "Surface Vehicle Recommended Practice," Jun. 2018, 35 pages, J3016™.
Seongbok Baik et al., "Machine learning in IMT-2020 and future networks: use cases and basic requirements," Jun. 17-28, 2019, 50 pages, International Telecommunication Union, 17289-TD1 (190617), Telecommunication Standardization Sector, Study Group 13, Study Period 2017-2020, Geneva, Switzerland.
U.S. Appl. No. 17/996,219, PCT/IB2020/056205 with claims priority to U.S. Appl. No. 63/012,042, Pending.
U.S. Appl. No. 17/996,218, PCT/IB2020/056206 which claims priority to U.S. Appl. No. 63/012,042, Pending.

* cited by examiner

Page 1

METHOD AND SYSTEM TO SHARE DATA ACROSS NETWORK OPERATORS TO SUPPORT WIRELESS QUALITY OF SERVICE (QOS) FOR CONNECTED VEHICLES

CROSS-REFERENCE TO RELATED APPLICATIONS

This application is a National stage of International Application No. PCT/IB2020/056207, filed 1 Jul. 2020, which claims the benefit of U.S. Provisional Application No. 63/012,042, filed 17 Apr. 2020, which are hereby incorporated by reference.

TECHNICAL FIELD

Embodiments of the invention relate to the field of connected vehicle navigation using mobile networks; and more specifically, to a method and apparatus for providing improved routing of connected vehicles using real time mobile communication network information.

BACKGROUND ART

Autonomous vehicles navigate independent of local manual control. An 'autonomous' vehicle, as used herein refers to a vehicle that is self-governed. Any type of vehicle can be an autonomous vehicle including cars, trucks, drones, planes, boats, and similar vehicles of any size or type. Autonomous operation generally indicates that the autonomous vehicle is able to navigate in an uncontrolled navigational environment where there may be significant uncertainties such that the autonomous vehicle is able to compensate for these uncertainties and for system issues or failures without human intervention. Levels of automation can be categories such as the levels 0-5 defined by Society of Automotive Engineers (SAE) International.

The autonomous vehicles utilize a large amount of data to make navigation decisions. Some of this data is collected local to the vehicle via sensors, while other data is received via mobile communication systems. Local sensors can include lidar, stereo vision, Global Positioning System (GPS), inertial measurement units (IMUs) and similar sensors. The locally collected data can be processed by the navigation algorithms of the autonomous vehicle as input along with locally stored terrain, map, geospatial, or similar data. The navigation algorithms can control the various systems of the autonomous vehicle, such as propulsion systems, steering systems, and similar systems. The navigation algorithms can also utilize computing resources and data that is not local to the autonomous vehicle.

The autonomous vehicle that is connected by communications networks with external computing and data resources is a type of 'connected vehicle,' which can receive and transmit large amounts of data between the onboard computing systems of the autonomous vehicle and remote computing systems using mobile communication systems. The data received can include data about local conditions such as weather, traffic, road conditions and similar data. The data transmitted can include data collected by sensors of the autonomous vehicle. However, exchanging this data with external computing resources can be interrupted or fall below necessary quality of service (QoS) levels where the mobile communication network has poor or no coverage making reliance on external computing resources and data problematic.

SUMMARY

In one embodiment, a method provides route information to a connected vehicle in a brokered information prediction system. The method includes determining available mobile communication networks that can provide real-time mobile communication network data, querying a first available mobile communication network to provide key performance indicators for a route for a connected vehicle, determining service level indicators for the route based on received key performance indicators for the route where the key performance indicators meet defined thresholds, and sending predicted service level indicators for the route to the connected vehicle.

In another embodiment, a network device is configured to implement the method of the brokered information prediction system utilizing real-time mobile communication network data. The network device includes a non-transitory machine-readable storage medium having stored therein a prediction service, and a processor coupled to the non-transitory machine-readable storage medium. The processor executes the prediction service. The prediction service determines available mobile communication networks that can provide real-time mobile communication network data, queries a first available mobile communication network to provide key performance indicators for a route for a connected vehicle, determines service level indicators for the route based on received key performance indicators for the route where the key performance indicators meet defined thresholds, and sends predicted service level indicators for the route to the connected vehicle.

In a further embodiment, the network device is configured to execute a plurality of virtual machines. The plurality of virtual machines implement network function virtualization (NFV). The network device includes a non-transitory machine-readable storage medium having stored therein a prediction service, and a processor coupled to the non-transitory machine-readable storage medium. The processor executes at least one of the plurality of virtual machines. The at least one of the plurality of virtual machines executes the prediction service. The prediction service determines available mobile communication networks that can provide real-time mobile communication network data, queries a first available mobile communication network to provide key performance indicators for a route for a connected vehicle, determines service level indicators for the route based on received key performance indicators for the route where the key performance indicators meet defined thresholds, and sends predicted service level indicators for the route to the connected vehicle.

In one embodiment, an electronic device in a software defined networking (SDN) network includes a plurality of data plane devices. The electronic device includes a non-transitory machine-readable storage medium having stored therein a prediction service, and a processor coupled to the non-transitory machine-readable storage medium. The processor executes the prediction service. The prediction service determines available mobile communication networks that can provide real-time mobile communication network data, queries a first available mobile communication network to provide key performance indicators for a route for a connected vehicle, determines service level indicators for the route based on received key performance indicators for the route where the key performance indicators meet defined thresholds, and sends predicted service level indicators for the route to the connected vehicle.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
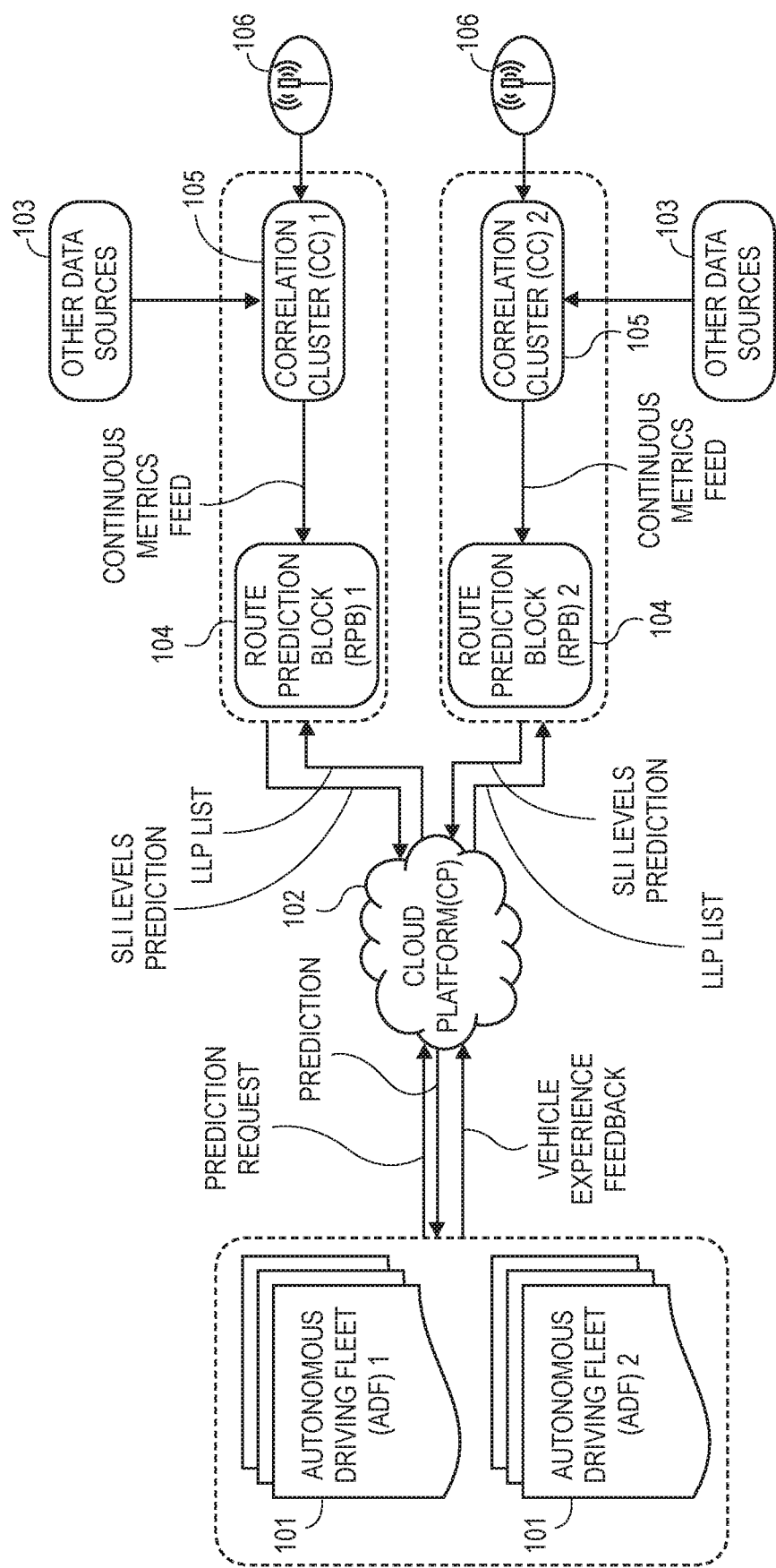
FIG. 1 is a diagram of one embodiment of an overview of the prediction system.

The following description describes methods and apparatus for improving the field of wireless mobile communication systems and connected vehicles. Connected vehicles can include any type of vehicle with a capability to communicate with external computing resources. Connected vehicles can include autonomous vehicles such as unmanned aircraft and driverless cars and trucks, autonomous sidewalk robots, vehicles or applications that consume media or other data sources in real time and while on the move. The embodiments provide methods and apparatus for accelerating the advent of connected vehicles by enabling greater certainty about the level of mobile service that the connected vehicles will experience on different routes of potential trips through a partnership with mobile communication network operators to use real time data from the mobile communication networks to provide connected vehicles with route and trip-specific data including road-focused prediction of quality of service along different potential routes, segments of routes or trips for the connected vehicles.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Autonomous vehicles and other types of vehicles with communication equipment on board rely on mobile communication systems (e.g., 4G or 5G mobile communication networks) to be capable of handling extensive levels of data transmission with a certain Quality of Service (QoS) between the vehicle and the computing resources accessible via the mobile communication networks. Such vehicles are referred to herein as 'connected vehicles' that rely on external data input to make navigation and other decisions. Each connected vehicle operator or manufacturer may have different requirements depending on the design of their connected vehicles and/or the operational and regulatory environment that the connected vehicles operate within.

The QoS of mobile communication networks varies with time and location. The variations can be large or small and can occur within a short period of time or within a short distance. In some cases, these variations are driven by known patterns like road traffic and therefore are seasonal and easily predictable. But in some cases, these variations are not easily predicted and can bring significant risk to the capability of connected vehicles and their operators to meet key operational and regulatory demands. Some situations that can bring up these unexpected variations include agglomerations of mobile communication network services users (e.g., concerts, traffic accidents, and similar events) or unexpected events within the mobile communication network like a tower failure. Connected vehicles and their operators mitigate this risk by contracting mobile communication network service with multiple mobile network operators (MNOs) with the expectation that, at any given time and location one of the MNOs will be able to meet the QoS requirements of the connected vehicle.

Autonomous vehicles are one example of a connected vehicle. Autonomous vehicles are discussed herein by way of example and not limitation. One skilled in the art would understand that the principles, functions, processes, and structures discussed herein with relation to autonomous vehicles are applicable to other types of connected vehicles and that autonomous vehicles are referenced for sake of clarity and conciseness. The processes of the prediction system are applicable to other types of connected vehicles that are not necessarily autonomous, such as vehicles that provide assistance to drivers or pilots via any type of feedback or information system, or vehicles or applications that consume or provide media or other data sources in real time and while on the move (e.g., trucks for television networks, ambulances with connected mobile equipment, public transportation with localized services like WiFi).

The QoS provided by mobile communication networks can vary across different areas of the mobile communication network that the connected vehicles could traverse. The variance in QoS across the mobile communication network can be due to differing network capabilities in different portions of the network (e.g., 5G or 4G service may not be available in all areas of the network), due to temporary changes in network conditions (e.g., outages or heavy network traffic), weather conditions affecting signal quality or similar issues.

Existing connected vehicle navigation systems focus on the shortest time to travel when determining a route to go from point A to point B and do not take mobile communication network QoS along the route into consideration. In some systems, historical mobile communication network QoS along a route is considered, where the historical mobile communication network QoS is collected in these systems by users reporting the past mobile communication network QoS experienced in different areas on a respective mobile communication network. These systems that use historical mobile communication network QoS data use crowdsourced data and are inherently not real-time. As used herein, 'real-time' data is data representing conditions within seconds, minutes, or hours of the data collection, rather than days, weeks, or months of data collection. 'Historical' data is collected days, weeks, or months prior to the current time. Although, these crowdsourced historical data tools and/or technologies are helpful, they are rendered inapplicable or inaccurate if there is not enough data available for a specific route (a very common problem with crowdsourced data) or if conditions change, which can happen also frequently (e.g., from hour to hour or even from millisecond to millisecond) due to the dynamic mobility patterns of mobile communication network environments.

Connected vehicles and their operators face avoidable uncertainties while choosing a route to go from Point A to Point B. The existing routing algorithms can recommend a route that has in the past met the QoS connectivity requirements of the connected vehicle, but during that particular moment or in the near future when the connected vehicle is driving along the recommended route the QoS can degrade and jeopardize the outcome of the trip and fulfilment of its purpose. A serious QoS degradation can endanger the public and can result in events that negatively impact the image and acceptance of connected vehicles.

The non-deterministic nature of the existing routing algorithms is one of the main reasons why connected vehicle operators contract mobile communication services with two or more different MNOs in an attempt to build redundancy and reliability into the operation but, because the existing routing algorithms do not take into account the quality of the mobile communication network services in real-time, the increase in cost of contracting with multiple MNOs for service does not always correlate with a reduction of the risks of inadequate QoS and thus it is in many times an unnecessary cost.

The embodiments overcome these issues and deficiencies of the prior art. The embodiments provide an improved optimization method through which a system can optimize routing options for connected vehicles with a confidence level for the different levels of mobile communication network QoS supported by the connected vehicle and for the different Mobile Network Operators (MNOs) accessible to the connected vehicle.

The embodiments provide a route prediction method and system based on real time mobile communication network data. The route prediction method and system can be utilized with any connected vehicle or related application that will benefit from knowing the expected mobile communication network QoS for a planned trip. Based on the expected start time of the trip, a recommendation of which MNO to opt for on each segment of the route can be determined by the prediction system and provided to a requesting connected vehicle. Thus, selecting the best available MNO will ensure uninterrupted and required QoS for the connected vehicle.

Example applications include autonomous vehicles capable of conditional driving automation (level 3) or above (as defined by the Society of Automotive Engineers in revision 2018-06 of their publication SAE J3016 and subsequent revisions), unmanned aircraft (e.g., large unmanned aerial vehicles (UAVs) or smaller drones), vehicles or applications that consume media or other data sources in real time and while on the move (e.g., video games, streaming video applications, and similar software). For the sake of clarity and conciseness, the example of an autonomous vehicle system, referred to as an autonomous vehicle, is used herein by way of example and not limitation. One skilled in the art would appreciate that the principles, structures, and processes described with relation to an autonomous vehicle are applicable to these cases and other similar connected vehicle cases.

The embodiments of the prediction system and method provide a process to predict the mobile communication system QoS that a connected vehicle will experience along the multiple segments that make up a route from Point A to Point B across multiple MNOs using real time mobile communication network data as the primary source of data. The prediction system and method replace the need to have software onboard the connected vehicles to collect training data by identifying moving connected vehicles from real time cellular network data. Individual connected vehicles and their experience information can be identified, and the information can be collected from mobile communication network data, rather than requiring the connected vehicle to directly report the experience information. The prediction system and method increase the robustness of the route prediction process relative to using sparse crowdsourced data. The prediction system and method identify and highlight intermittent service degradations like coverage holes or abnormal QoS reductions using radio coverage patterns and telecommunication domain-knowledge expertise.

A connected vehicle that is designed to utilize the embodiments can be configured with a profile that identifies the information that will be utilized by the connected vehicle to communicate with mobile communication networks and as part of the routing process. The profile can include identifying information for the mobile communication network operators (MNOs) contracted with the connected vehicle and the order of preference for using the MNOs. The configuration information can further include the supported mobile communication network service QoS levels (e.g., at least 10 Mbps or at least 5 Mbps of uplink or downlink throughput), which then get mapped into Service Level Indicators (SLIs) (e.g., SLI3 for more than 10 Mbps, SLI2 for more than 5 Mbps but less than 10 Mbps, and SLI1 for less than 5 Mbps).

The embodiments include a prediction system and process provided by one or more electronic devices of an operator of the prediction system and in some embodiments one or more of the MNOs. The prediction service receives from a connected vehicle either a request for a route for a trip or a request for a prediction for a given route for a trip. The profile information is also shared with the prediction system. The route or the prediction for the given route is calculated based on the MNOs stored in the profile and using various mobile communication network parameters and real time mobile communication network data such as coverage area, required QoS, current subscriber level and cell level cellular wireless QoS, antenna, alarms, past performance, handover settings and a reliable propagation model that uses a digital model (e.g., Digital Terrain Model (DTM), Digital Elevation Model (DEM), or Digital Surface Model (DSM)) and/or clutter maps that are utilized in optimizing and developing a realistic prediction algorithm. The calculations of the prediction system also consider past predictions and the correlation of these past predictions with the actual mobile communication network QoS experienced by connected vehicles during current trips, or after trips are completed. The prediction service can also use input from external sources like mapping companies, weather services, and similar sources.

The prediction system can receive a destination and determine a route to that destination or can receive a set of routes from a connected vehicle to analyze. A 'set,' as used herein can refer to any whole number of items including one item. The route is split into multiple segments and a prediction is created for each segment and for each applicable MNO based on the profile for the connected vehicle. The prediction system determines the most likely QoS level to be experienced in each segment for each MNO along the route based on the supported levels defined in the profile. Based on the policies set by the profile or the prediction system, the prediction process will consider the preferred MNOs, previous segment MNO recommendation, and the most desirable key performance indicator (KPI) level used for prediction.

In some embodiments, the connected vehicle can include software specific to interacting with the prediction system to report the actual QoS for a utilized mobile communication network experienced along the trip together with some other relevant parameters like location, speed, driving conditions, and similar information.

The embodiments provide advantages over the existing art by the use of real time mobile communication network data for route prediction of connected vehicles. Since resource allocation is critical for supporting mobility and providing QoS in mobile communication networks, it is very important to capture the movement pattern of connected vehicles accurately. The embodiments further provide a propagation model for predicting issues with QoS in a mobile communication network. Prediction of path loss or degradation is an important element of the operation of the processes and system of the embodiments as the environment is constantly changing with time. In some embodiments, a combination of machine learning models that consider weather and time aspects are utilized.

A further aspect of the embodiments is a process and system for purchasing data from the available MNOs to provide to the connected vehicle a single point of purchase for navigation and related QoS regardless of the number of MNOs that the connected vehicle can access or that provide contracted service for the connected vehicle.

In some embodiments, the prediction process can be deployed (e.g., in a distributed manner) within the components and devices of a prediction system operator. In other embodiments, some components can be deployed within devices of each MNO to ensure that the proprietary data of the respective MNO that is used for the prediction process do not leave the MNO's components, devices, and facilities (i.e., only anonymized, transformed, or similarly obfuscated data is provided outside of the mobile communication network of the associated MNO). However, the components deployed within the devices of the MNO can be administered by the prediction system operator.

These aspects of the embodiments can be combined in any combination or separately to enable the finding of the best route based on forecasting models built on collected data including real time data of the available mobile communication networks. The prediction model and process collect, analyze, and act upon mobile communication network data in real-time and leverage machine learning tools to generate real-time connected vehicle route recommendations.

FIG. 1 is a diagram of one embodiment of an overview of the prediction system. The diagram illustrates at a high-level view the end to end data flow of the embodiment across the prediction system. The diagram illustrates two inter-related data flows. One data flow is the online process flow and the other data flow is the offline process flow. The diagram illustrates the interrelationship of the components as part of the online and offline processes, while the arrows indicate the movement of data between the component for the online and offline processes.

The online data flow process is initiated whenever there is data received by the prediction system from a set of Autonomous Driving Fleets (ADF) 101 via a cloud platform (CP) 102 or similar computing environment hosting the prediction system. The ADF is a set of autonomous vehicles having any number or variety of autonomous vehicles. Each ADF can represent a separate service, navigation system, autonomous vehicle manufacturer or similar grouping of vehicles. The autonomous vehicles of each ADF can communicate directly with the prediction system, or an ADF can have supporting network infrastructure such as mobile communication networks provided by MNOs that relays the information to the prediction system. In some embodiments, the ADFs 101 are groupings of autonomous vehicles according to their primary connecting MNO. The example case of ADFs 101 utilizing the prediction system is provided by way of example and not limitation. One skilled in the art would understand that the prediction system can be utilized by groups of connected vehicles in a similar manner.

The received data from the ADF 101 can include route prediction requests. In some embodiments the received data can also include any amount or variety of collected sensor, environment, and driving related data. The data received from each ADF 101 can be sent by the cloud platform 102 to a route prediction block (RPB) 104. An RPB 104 can be executed on hardware of a prediction system service provider. In other embodiments, an RPB 104 can be executed at each MNO for processing data collected by that MNO and to get the predictions. However, even when the RPB 104 is executed on hardware of an MNO it may be administered by the prediction system service provider. An RPB 104 can provide route predictions to a requesting ADF 101 or similar entity. Each RPB 104 responds with route QoS predictions, which are then sent to (or toward, via the cloud platform 102) the ADF 101 or the specific autonomous vehicle, which requested the route prediction. The RPBs 104 can be executed at the same cloud platform 102, at separate computing facilities or otherwise distributed. Each RPB 104 can include its own propagation model. RPBs 104 and correlation clusters (CCs) 105 can be hosted on MNO network hardware (i.e., on a per MNO basis). In other embodiments, the RPBs 104 or CCs 105 can be hosted on hardware of a prediction system service provider. In either case, the prediction system service provider can administer the RPBs 104.

RPB 104 includes a machine learning forecasting model, radio propagation model referred to herein as a 'propagation model,' and focused mobility model. The machine learning forecasting model estimates and predicts the key performance indicators (KPIs) for each vehicle and route segment by taking engineered telecom features as inputs. Mobile communication network features include network KPIs and subscriber KPIs filtered by the focused mobility model. The focused mobility model is described with relation to FIGS. 5 and 6 herein.

The online process can be further divided into an online scoring process and online experience correction process based on the data received from the ADF 101. The online scoring process is initiated whenever a request is received from the ADF 101 with a list of locations, segments, or similar identifiers for which a QoS score or rating is requested. The prediction system as implemented via the respective RPB 104 responds to the ADF 101 by sending the predicted QoS scoring of the given identified locations, segments, or similar elements identified by the request from the ADF 101. Multiple online processes could be running at the same time and each of the online process would be tracked by a process or request ID to enable the received requests to be correlated with responses from the associated RPB 104.

An online experience correction process can be initiated whenever an ADF 101 experience data is received by the RPB 104. This experience data is correlated with the past predictions of the online process at RPB 104. Thus, the predicted QoS provided to the ADF 101 by the RPB 104 is correlated with the experience data returned by the ADF 101 to compare the prediction with the actual experienced QoS. This correlation of experience data enables the measuring of the existing accuracy of the models along with providing a mechanism for correction for the future predictions. The online experience correction captures information that the ADF 101 may share with the CP 102, e.g., either when making the route prediction request or at a later time, and uses this information to identify specific deviations and anomalies of a given ADF 101 and account for them in the offline models.

The offline process is a continuous process that runs at all times or at regular intervals. The offline process collects and correlates the data from the mobile communication network 106 and experience data from the ADF 101. The collected data is enhanced with other sources 103 and past collected data. This correlated data is stored for historical purposes by the associated RPB 104. The data collected from the mobile communication network 106 can include QoS information such as throughput metrics, operational status, latency and similar information. In some embodiments, each MNO can communicate the mobile communication network data to correlation clusters (CC) 105. The CC can be administered by an MNO or by a separate provider operating the prediction system. The CC can aggregate information for the mobile communication network associated with the MNO or similarly organizes or marshals the data to be provided to the RPB 104 associated with the MNO.

The offline process can be further divided into an offline service level indicator (SLI) modelling process and an offline retraining process. Multiple offline models can be created from combinations of these sources. The offline models can include an SLI model, mobility model, and/or a propagation model, which are referred to herein as offline models, generally. The SLI model matches network information such as cell tower KPI values to an SLI value in a geographical area relevant to a route or segment. The SLI modelling involves the network data being fed to all the offline models, which are then scored based on performance. Any number and variety of offline models can be utilized by each RPB 104. Each offline model can be a machine learning (ML) model having been trained on different sets of input data to generate SLI predictions for areas, segments, routes, locations, or similar divisions of a mobile communication network.

A mobility model identifies moving/driving devices from the mobile communication network data to target more relevant data for offline training. A propagation model manages how a geographical area is covered by a mobile communication network (e.g., specific cell tower) and determines KPI values for more precise geolocation. In some embodiments, a routing model is utilized to split a route into segments and can optimize a route as well as match forecast SLI levels from the SLI model. The routing model is considered to be part of the online process. Different offline models can use different inputs and training sets. For example, an offline model can include input information based on the weather and time of the day that can be utilized to contribute to the overall route prediction. The weather influenced offline models take into consideration atmospheric affects, which contribute on average to −3 to −20 dB loss for signals in a mobile communication network. The best performing offline model in the offline process is promoted to make predictions in the online process. Similarly, the current offline model can be downgraded from use by the online process.

The offline retraining process involves storing the experience data received from the ADF 101. The experience data is then compared with actual forecast data for the offline models and the deviation between the actual forecast data and experience data is used to correct the offline models and fed to the offline models as training data or adjustments to hyperparameters, which enables the offline models to continuously learn from the feedback experience data. The offline model retraining process extracts the past experiences of the ADF 101 from the mobile communication network data and uses this information to correct the offline models.

In the diagram of FIG. 1, the offline process shows the ADF 101 providing vehicle experience feedback about the constituent autonomous vehicles and their requests for predictions. The vehicle experience feedback can include location information, actual QoS information, and similar information. In some embodiments, the vehicle experience information is forwarded from the CP 102 to the RPBs 104 or other components.

The ADF 101 receives prediction information from the CP 102 as part of the online process in response to prediction requests. In some embodiments, the ADF 101 further provides vehicle experience feedback information to the CP 102 with the prediction requests or separately. The CP 102 aggregates the location information into latitude longitude pair (LLP) list information that lists requested locations where a prediction is requested. The LLP list is sent to the RPB 104. The RPB 104 generates a set of SLI predictions based on the current propagation model that are returned to the CP 102. The CP 102 then forwards experience data to the RPB 104. The RPB 104 also receives continuous updates of mobile communication network metrics from a correlation cluster 105 that is collected from the mobile communication network 106.

The operation of the components in the online and offline process are further described in relation to FIGS. 2 and 3, which further break down the operation of each of the components in the prediction system.

These components are independent from each other and can be considered as autonomous and substitutable modules. Such a characteristic of the overall process allows the prediction system to isolate computationally heavy data correlation and modeling steps from lightweight application programming interface (API) calls from a potential end-user (e.g., from an autonomous vehicle). Additionally, the prediction system gives the advantage of connecting the models of the online process with different offline modules by configuration depending on the preferences of the administrators.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2A:
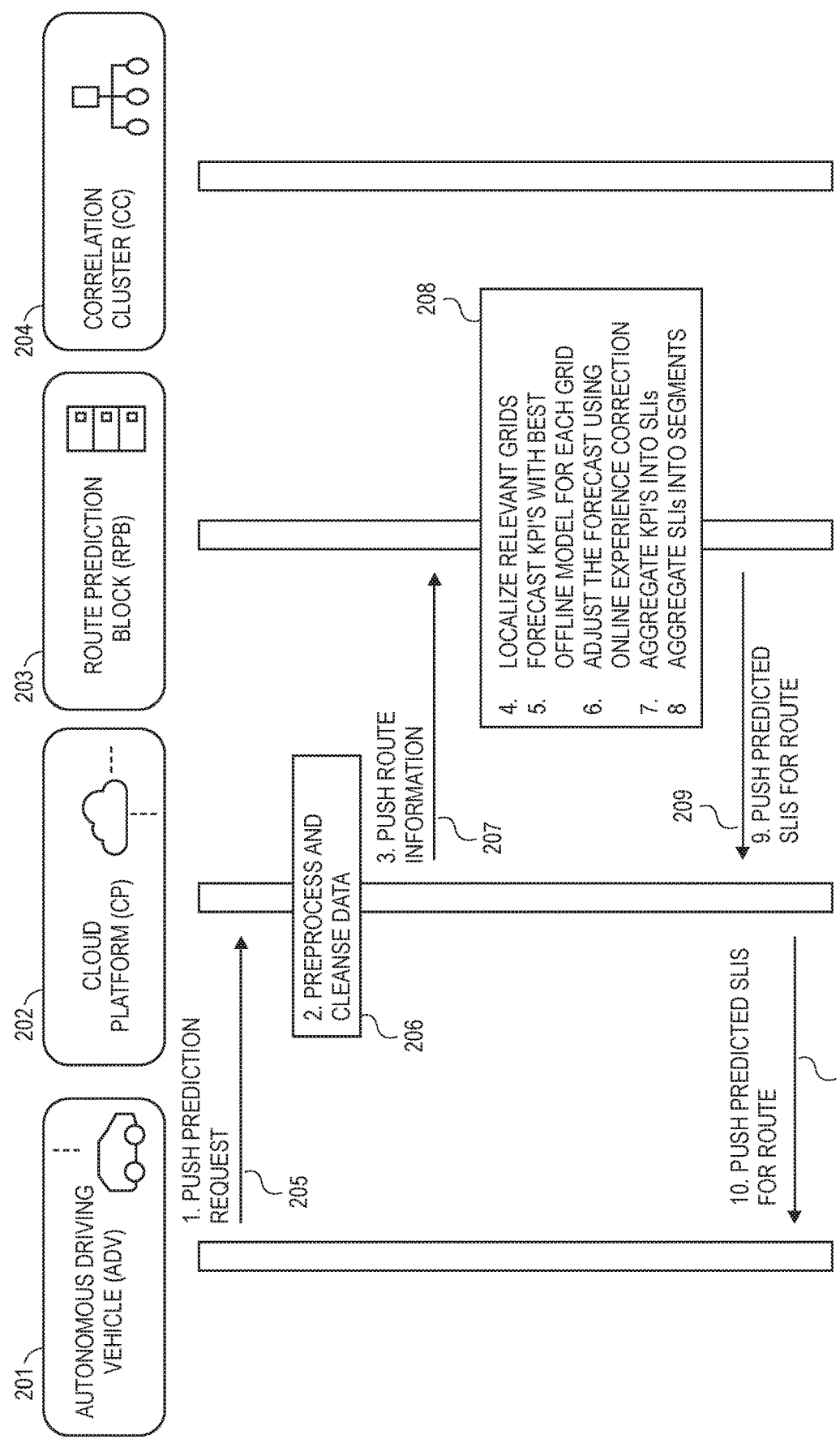
FIG. 2A is a diagram of one embodiment of the online process of the prediction system.

FIG. 2A is a diagram of one embodiment of the online process of the prediction system. The illustrated example shows the API call flow from the prediction request of the autonomous driving vehicle (ADV) 201 to the end response returned by the CP 202 to the ADV 201. The online process uses the best current offline model available to the RPB 203, which will be used for scoring the ADV input data. The process starts with the ADV system 201 sending a prediction request (e.g., using a POST request) with detailed route information including Latitude Longitude Pairs (LLP) and other supporting information 205 to the API deployed on the CP 202. The posting of route and experience information 205 can be on a per ADV 201 basis with individual data points or can be an aggregation of information (bulk). The route and experience data will be pre-processed and cleaned for further use 206 by the CP 202 with the most relevant information sent to the RPB 207 (e.g., via a push route information). The pre-processing can include creating several possible routes if the request by the ADV 201 does not include a pre-defined route. Any process or mechanism can be used to clean or process the data at the CP 202 such as discarding of malformed data, removal of duplicate data, and similar processes.

The RPB 203 can store or access mobile communication network topology and operation data (e.g., cell tower network data and similar operational metrics) and correlates this information with the route LLP. For example, the mobile communication network topology and operation data can be correlated with the route and experience data requests according to the distance of mobile communication equipment (e.g., cell towers) from the route and cell tower characteristics. The RPB 203 can proceed with correlating detailed location information (e.g., relevant cell towers or grids) provided for the forecasted Key Performance Indicator (KPI) value selection with best offline model for each grid. In some embodiments, the offline models are targeted to cell coverage area (e.g., with a focus on the cell tower) or geographical grids (e.g., a focus on latitude and longitude rectangles). With the grid approach, when there is a forecast, the relevant route area is split into small grids (e.g., 10×10 or 30×30 meters) and an experience forecast is made for those grids regardless of cell locations, which can be taken care by propagation modeling. In other embodiments, there is a forecast made for each cell, that is related to its coverage zone. An approximate probability distribution is made for an area being served by each of the cell towers. The experience forecast combines these probability distributions as a weighted average.

This correlation process is followed by an online scoring process using the best offline model, adjusted with the current ADV information, aggregated into SLI level predictions based on dynamic threshold levels, and then correlated to locations of route segments 208. Finally, forecasted SLI levels for route segments are sent back to the cloud platform 209 and then the CP 202 sends the SLI levels to the initial call sender ADV 210. While the forecasting of SLI levels is done continuously in short-term batch mode, the KPI value forecasts are linked to the route not only by location from a given LLP, but also linked by the time taking into consideration either expected vehicle speed and distance (e.g., in a default mode) or third-party routing API predictions (e.g., in an advanced mode).

Figure 2B:
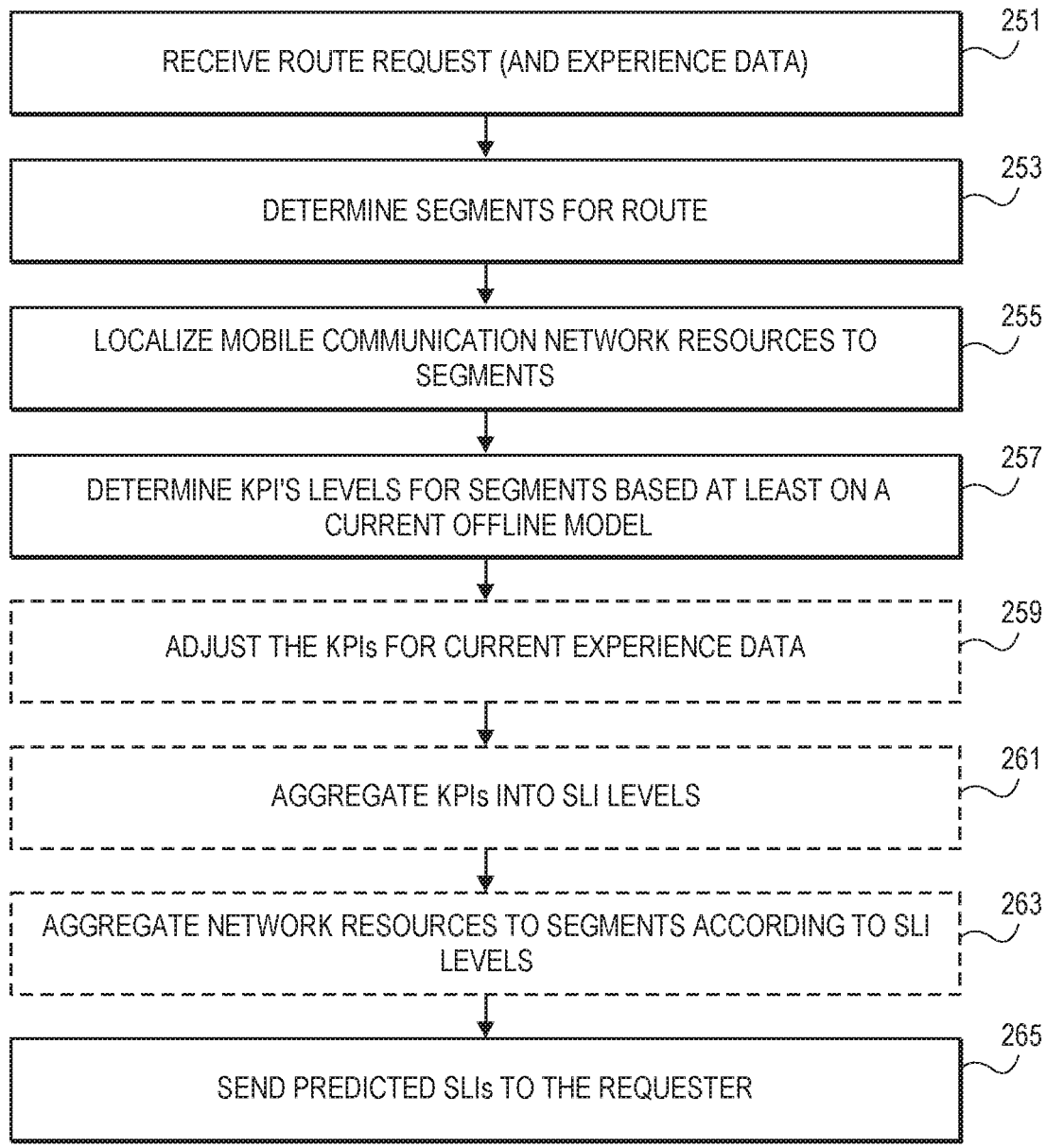
FIG. 2B is a flowchart of one embodiment of the online process implemented by a route prediction block (RPB).

FIG. 2B is a flowchart of one embodiment of the online process implemented by the RPB. The diagram is described as an operation of a single RPB associated with one MNO, however, the process applies to embodiments where multiple RPBs are operating in association with multiple MNOs. The RPB process is initiated by receiving a route request that originated with an ADV (Block 251). The route request can specify a route using an LLP list or similar description of the route. In some embodiments, experience data indicating actual QoS for a given location and MNO can be provided. The RPB can organize the route information into segments (Block 253). Segments of the route can correspond to areas covered by the mobile communication network or be similarly defined; thus, the mobile communication network resources are correlated with the route and specifically with particular segments of the route (Block 255).

A set of KPI levels is identified for a segment as determined by the current offline model utilized by the online process (Block 257). Each offline model can utilize different inputs. For example, some offline models utilize specific weather condition information (e.g., cloud coverage or precipitation), while others may not. The current offline model, which is an offline model selected for use by the online process, outputs a set of KPIs that rate mobile communication network coverage for a segment (e.g., for a particular cell tower that covers a segment). Where current experience data has been received, this data can be processed, which can be utilized to adjust the KPIs of the mobile communication network or specific components of the mobile communication network (Block 259). For example, if the ADV reports low QoS for a current segment and selected mobile communication network, then that rating (i.e., KPIs) can be downgraded or similarly adjusted to reflect the feedback. The set of output KPIs from the current offline model can be aggregated and correlated with SLI levels (Block 261). The KPIs output by the current offline model can be correlated with SLI levels by using threshold levels or similar mechanism for mapping the KPIs with SLI levels.

The process can then aggregate the SLI levels for the mobile communication network components and resources for each segment of the received route (Block 263). This set of SLI levels or similar QoS ratings for each segment can then be prepared and sent to (or toward, via the cloud platform 202) the requester using any communication method, protocol, or format (Block 265).

Figure 3A:
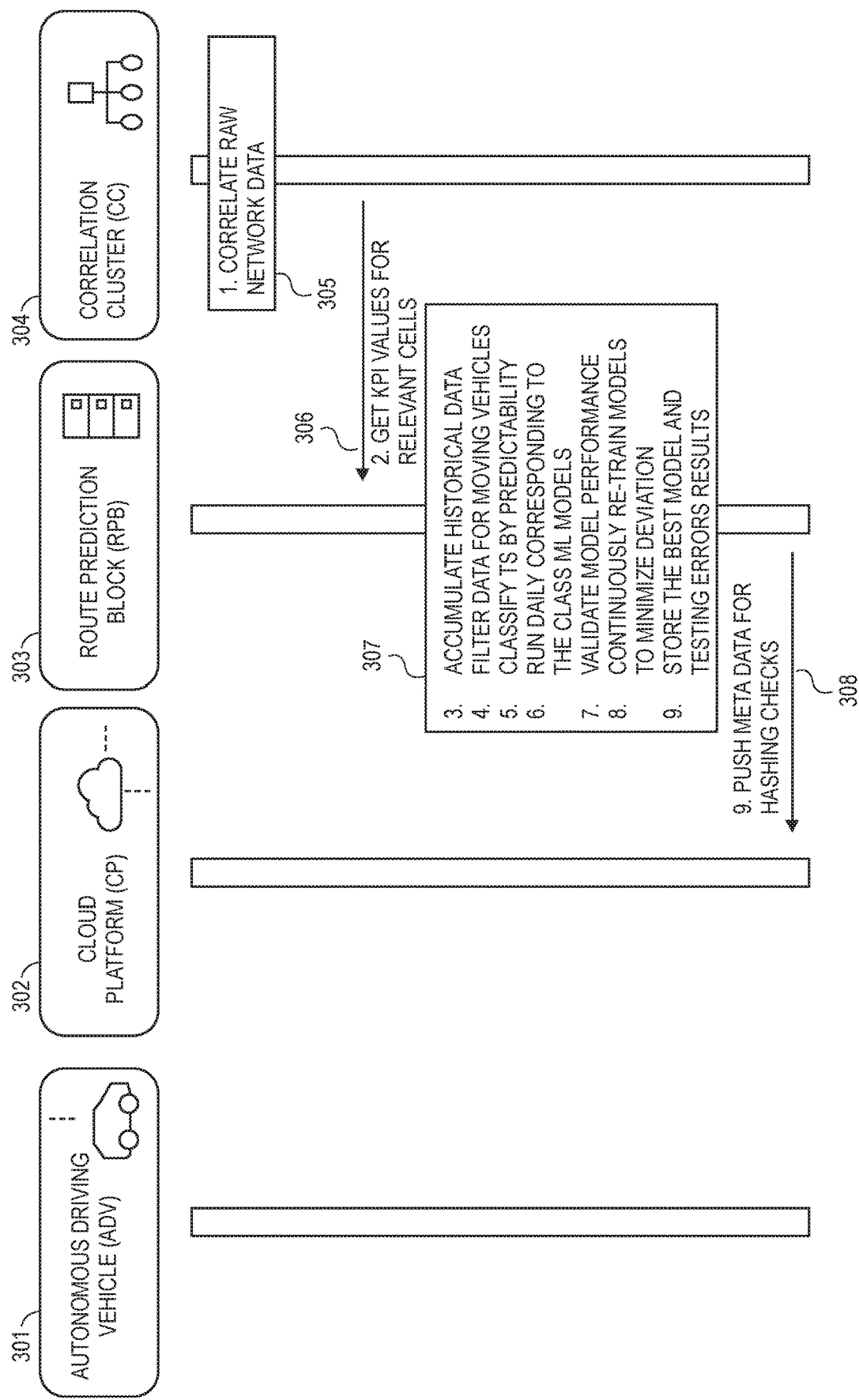
FIG. 3A is a diagram of an offline process for the prediction system.

FIG. 3A is a diagram of one embodiment of an offline process for the prediction system. The example diagram of FIG. 3A illustrates the offline process for a per network resource (e.g., cell tower) KPI level forecast generation. The offline process can be initiated with raw network data correlation 305 in the scalable correlation cluster (CC) 304. Processed data (e.g., KPI values for relevant cells) is then continuously pushed 306 to the specific RPB 303 where the data is accumulated for predictive modeling. Once enough data is obtained, a set of offline models are built, e.g., one or more models targeting per cell tower KPI values prediction 307. The building of the offline models utilizes machine learning techniques. The received network data is accumulated with historical data. The data can be filtered to focus on data relevant to servicing mobile devices (i.e., autonomous vehicles including ADVs). Each of the offline models can be trained using the accumulated data or varying subsets thereof.

In one example embodiment, each cell tower Time Series (TS) data will be classified in terms of predictability and statistical characteristics. The updated offline models are validated to confirm that they perform appropriately with test input or similar validation mechanism. The updated offline models can be model objects and along with their validations the model objects are stored for use by the online process where the online process can select to use the offline model that has the best accuracy, experience data feedback, or similar selection mechanism. Periodically, a table or similar data structure tracking the offline models and validation results is updated at the CP with a push job 308 or similar update mechanism from the RPB to keep most up-to-date information available in the CP to the ADVs.

Figure 3B:
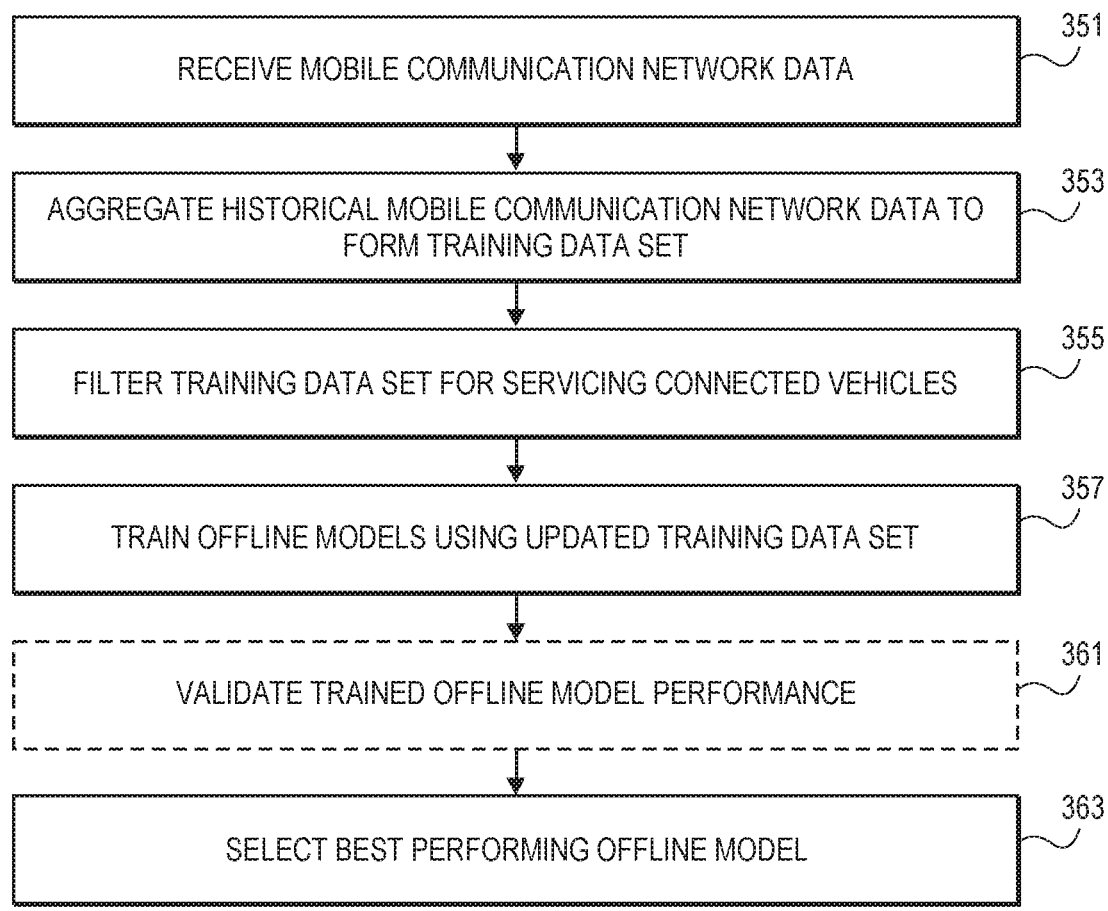
FIG. 3B is a flowchart of one embodiment of the operation of the RPB implementing the offline process.

FIG. 3B is a flowchart of one embodiment of the operation of the RPB implementing the offline process. The RPB can initiate an iteration of the offline process to update the offline models in response to receiving network data from a CC or similar source of mobile communication network data (Block 351). The network data can include any number of different metrics for any number of mobile communication network devices including operational status, throughput, latency, maintenance, resource utilization, and similar information. The received mobile communication network data can be combined with previously received mobile communication network data to form a training data set to train the offline models (Block 353). This training data set can be filtered or similarly refined to focus on mobile communication network data that is relevant to predicting QoS for autonomous vehicles as they traverse a route (Block 355).

With the training data set prepared, the offline models can be trained against the updated information (Block 357). After the offline models have been trained and further modified, they may be validated by testing mechanisms to determine the accuracy of each offline model and identify errors (Block 361). The offline model with the best performance can be selected for use in the online process and can be referred to as the 'current' offline model while in use by the online process (Block 363).

Figure 4:
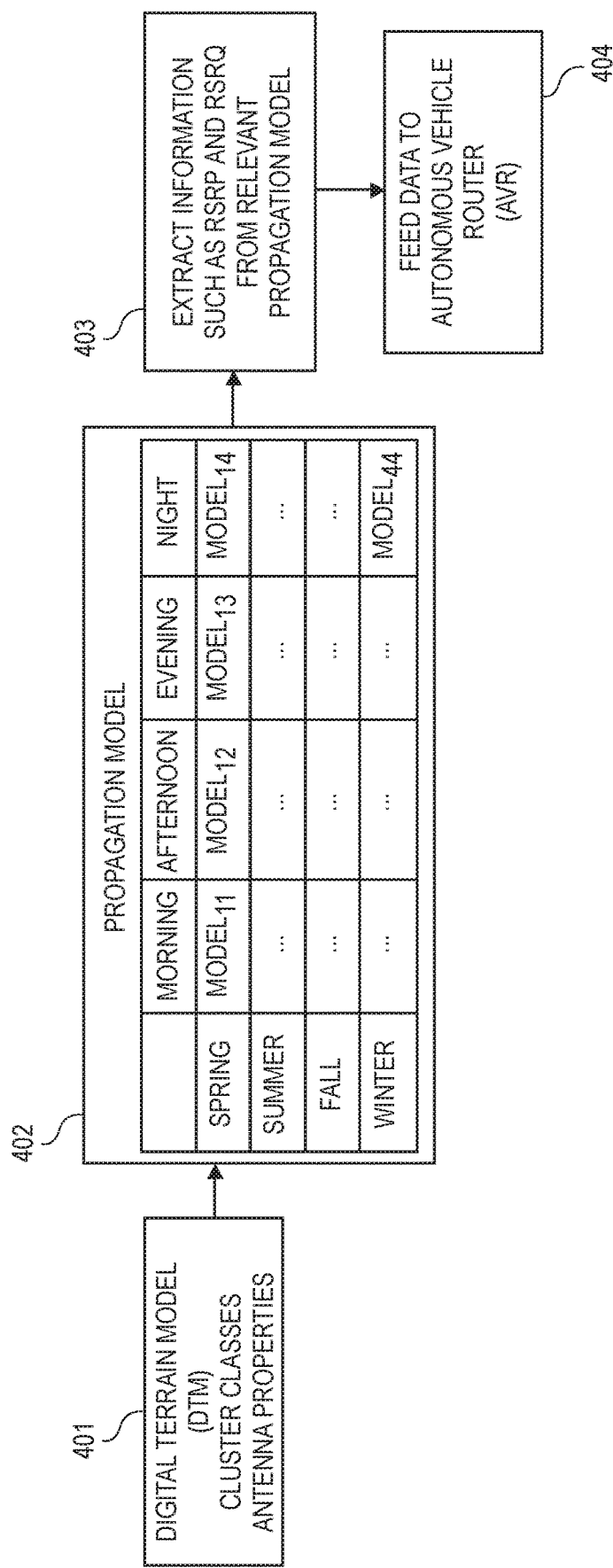
FIG. 4 is a diagram of one example of a propagation model.

FIG. 4 is a diagram of one example of a propagation model. The example propagation model with different combinations for the time of the day and weather is generated by providing a Digital Terrain Model (DTM), Cluster Classes, and antenna properties 401. In other embodiments, a Digital Elevation Model (DEM) or Digital Surface Model (DSM) may be utilized instead of, or in addition to, a DTM. In the illustrated example, the propagation model is composed of sixteen different models that are generated for different time-weather combinations 402. The propagation model can output information such as KPIs including Received Signal Received Power (RSRP) and/or Received Signal Received Quality (RSRQ) 403. Multiple propagation models can be maintained and the properties of each can vary according to the MNO and similar considerations. The predictions of the propagation model are fed to the RPB (e.g., an autonomous vehicle router (AVR)) 404.

Figure 5:
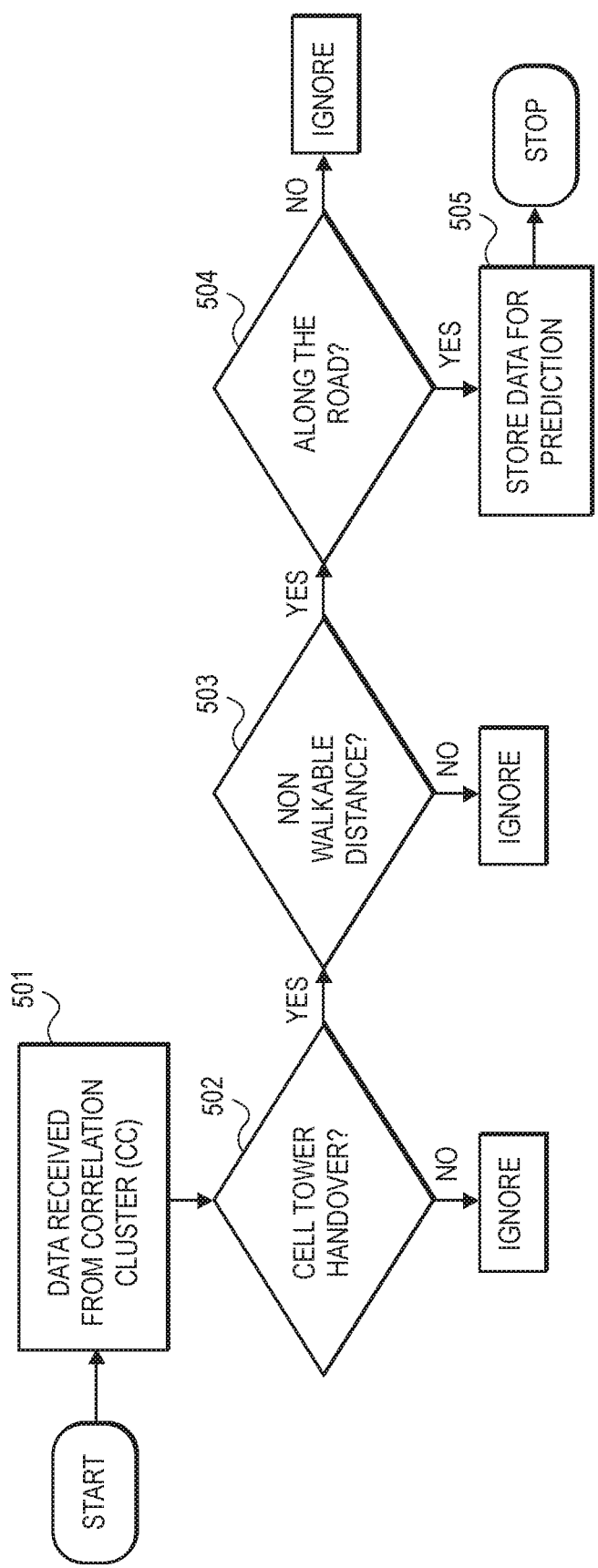
FIG. 5 is a flowchart of one example embodiment of a process of filtering the network data to be used by the offline process.

FIG. 5 is a flowchart of one example embodiment of a process of filtering the network data to be used by the offline process. The filtering process can be implemented by a focused mobility model in the offline process. The example filtering process is provided by way of example and not limitation, and one skilled in the art would understand that other similar filtering processes can be utilized in conjunction with the online and offline processes. The process provides a classification of the data to filter out the data that is not relevant for training offline models. The filtering process filters network data to identify network data associated with high mobility. The input data is obtained from a CC (Block 501) and can be filtered sequentially to get desired data for the offline process. In the example, the first filter validates whether within a short-continuous time flow any handovers have occurred (Block 502). If the data does not relate to handovers, then this data can be discarded or ignored. For data that is related to handovers, the function checks whether the distance between mobile communication network cells is not walkable (i.e., a long distance) for a given time period (Block 503). If the data is related to a walkable or short distance, then the data can be discarded or ignored. For data that is related to a longer distance (i.e., a non-walkable distance), the data is analyzed to determine whether it correlates geo-spatially with nearby roads (Block 504) to confirm the data is relevant to moving along public roads that may be navigated by the autonomous vehicle. If the data is not correlated with a navigable road, then it may be discarded or ignored. The data that is related to navigable roads can be stored for using in the offline process (Block 505). This filter function is provided by way of example and not limitation. The filtering of data can utilize any number or variety of classifications that can improve the relevance of the data to the route prediction process of the prediction system.

Figure 6:
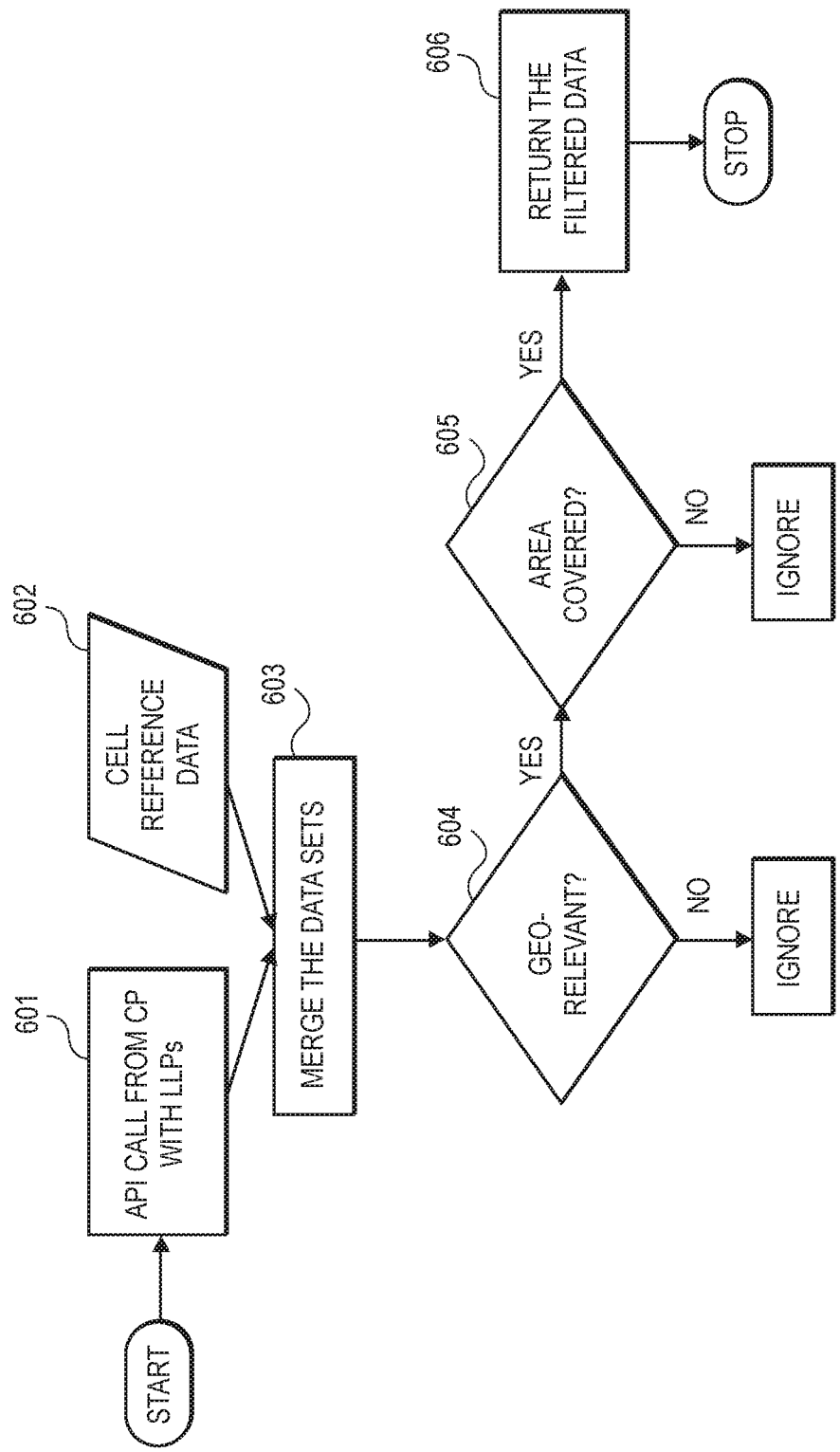
FIG. 6 is a flowchart of one embodiment of a process of a mapping function to correlate mobile communication network data to routes.

FIG. 6 is a flowchart of one embodiment of a process of a mapping function to correlate mobile communication network data to routes. The example mapping function is provided by way of example and not limitation, and one skilled in the art would understand that other similar mapping functions can be utilized in conjunction with the online and offline processes. In the illustrated example, the mapping function identifies relevant mobile communication network components (e.g., cell towers) for an input route. The process can be initiated by an API call of the CP that provides an LLP list for a route (Block 601). The mapping function also utilizes as input mobile communication network component LLP information (e.g., cell tower location information) from a reference data set (Block 602). These data sets are merged for further processing (Block 603).

There are two groups of correlations involved in the mapping process, whether mobile communication network components (e.g., cells) are located geographically close enough to the input route (Block 604) and whether mobile communication network components (e.g., cells) have physically strong signal coverage on the input route (Block 605) considering cell characteristics such as frequency band, tilt angle, probability of being selected in that area, and similar consideration. If mobile communication network components are not geo-relevant or do not provide route coverage, then the data associated with these components can be ignored or discarded. Based on this mapping only relevant mobile communication network components (e.g., tower cells) are output for further data filtering or processing in the offline process (Block 606).

Figure 7:
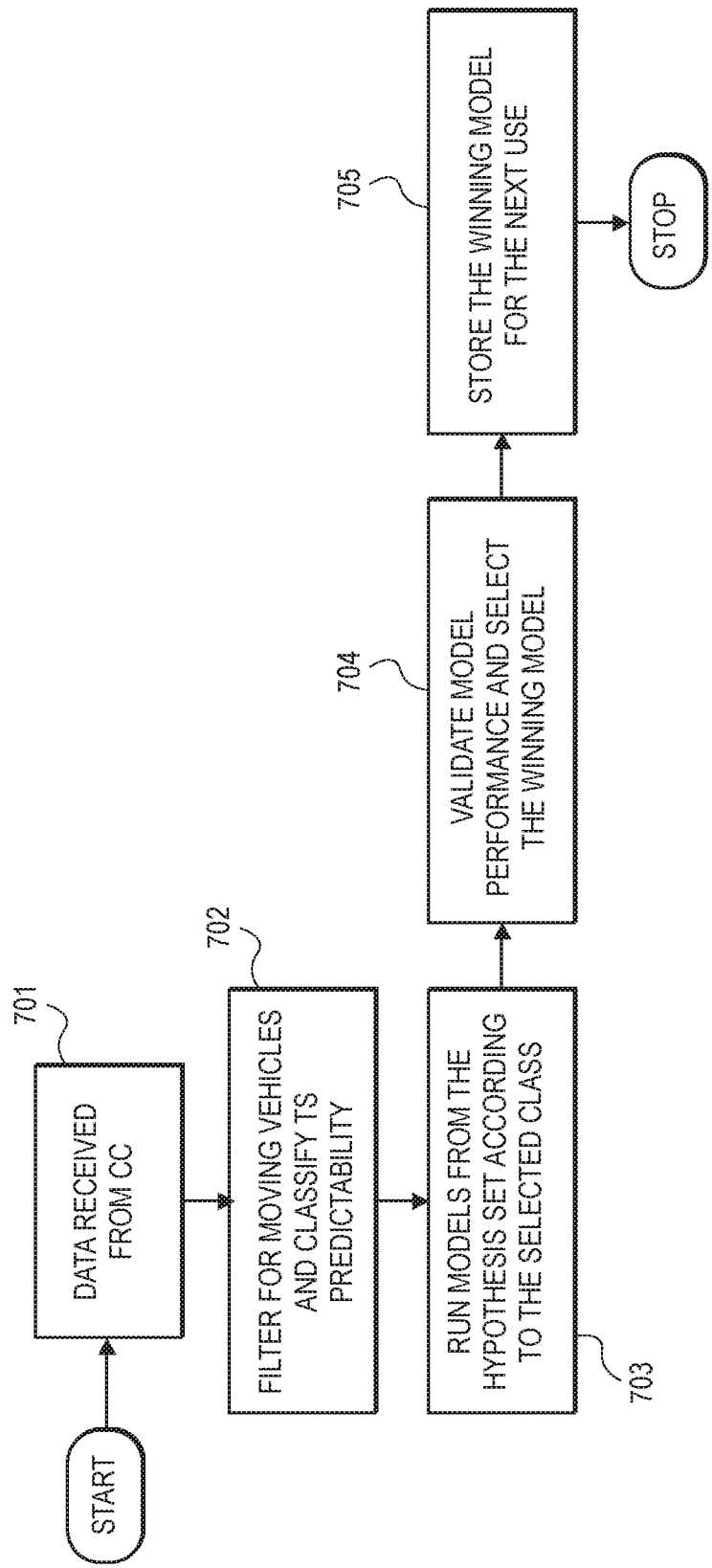
FIG. 7 is a flowchart of one embodiment of the offline SLI modeling implementation.

FIG. 7 is a flowchart of one embodiment of the offline SLI modeling implementation. The illustrated process illustrates offline process application where a best (i.e., winning forecasting model) is selected to be applied for the online process. The example forecasting model training is provided by way of example and not limitation, and one skilled in the art would understand that other similar modeling functions can be utilized in conjunction with the online and offline processes. The process is initiated using input mobile communication network data that is obtained from a CC or similar source (Block 701). The input data is filtered for relevance for routing with autonomous vehicles (e.g., as set forth with relation to the filtering function described herein) and classified into different time series (TS) clusters according to series statistical characteristics (Block 702). An offline model corresponding to the most probable class is trained on TS data (Block 703) which can then be analyzed with cross-validation techniques (Block 704). All offline models, validation metrics, and the best model object will be stored (Block 705) for further use in the online process.

Figure 8:
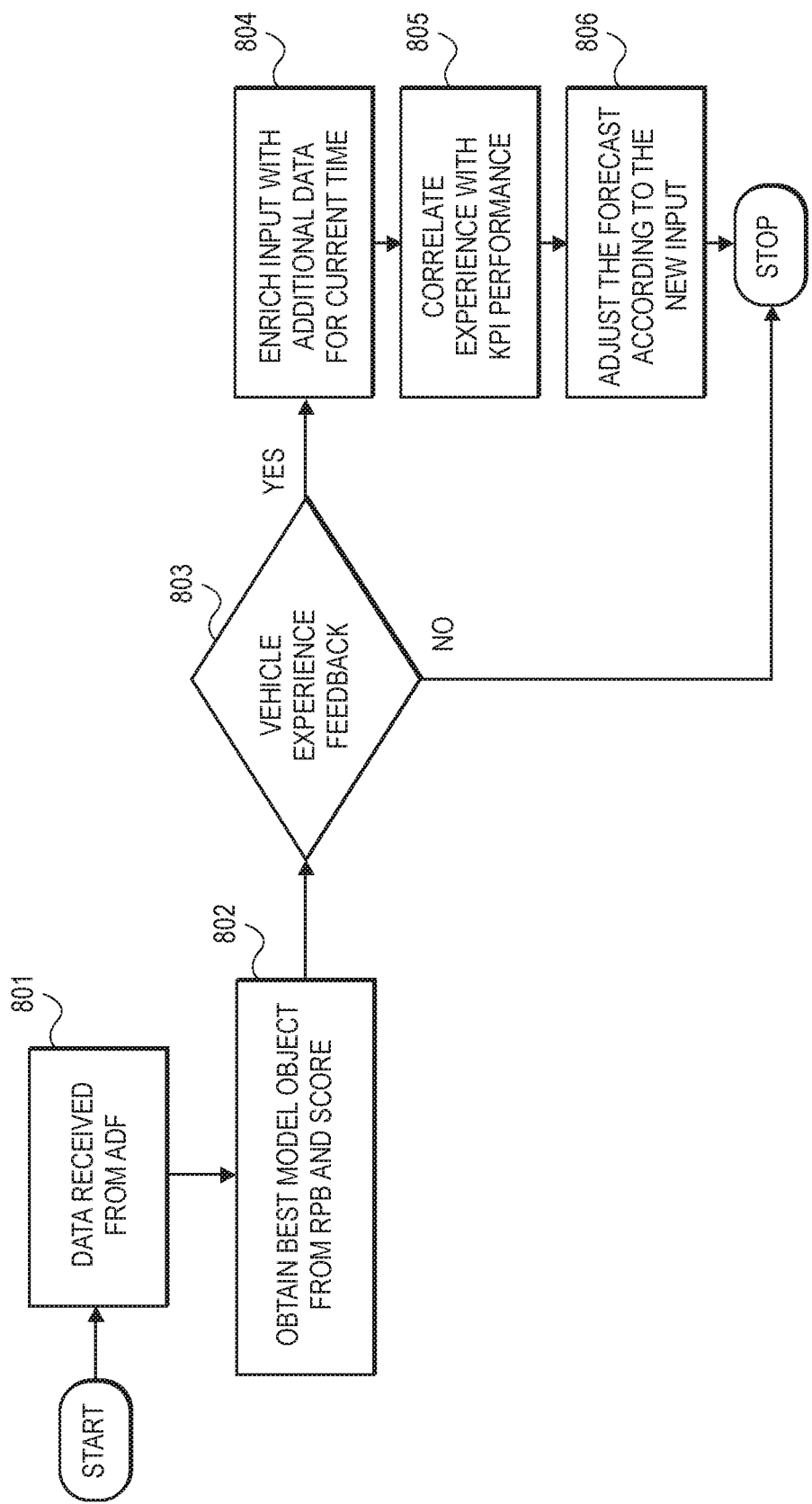
FIG. 8 is a flowchart of one example embodiment of feedback function for the online SLI scoring implementation.

FIG. 8 is a flowchart of one example embodiment of feedback function for the online SLI scoring implementation. The example feedback function is provided by way of example and not limitation, and one skilled in the art would understand that other similar feedback functions can be utilized in conjunction with the online and offline processes. As described herein, the online scoring process utilizes an offline model identified by the offline process for generating route prediction information. The feedback function utilizes experience data reported from autonomous vehicles to determine the accuracy of the predictions made by the prediction service. In this example embodiment, the feedback function of the online scoring process can be initiated in response to receiving data obtained from the ADF (e.g., through an API POST call) (Block 801) or similar mechanism. The feedback function accesses the currently selected offline model as identified by the offline process (Block 802). A check is made whether the API POST call includes experience data (Block 803). In the case where the API POST call does not contain experience data or similar information about current network performance and mobility experience, the current offline model will be used to score the minimal required data and the process is completed. In some embodiments, the received experience data from the API POST call will be used with additional indicators of current performance (Block 804) by correlating current experience data (i.e., indirect KPIs) with predicted main KPI values (Block 805). If the predicted values are misaligned with the current performance, then the forecast will be adjusted by the misalignment factor (Block 806).

Figure 9:
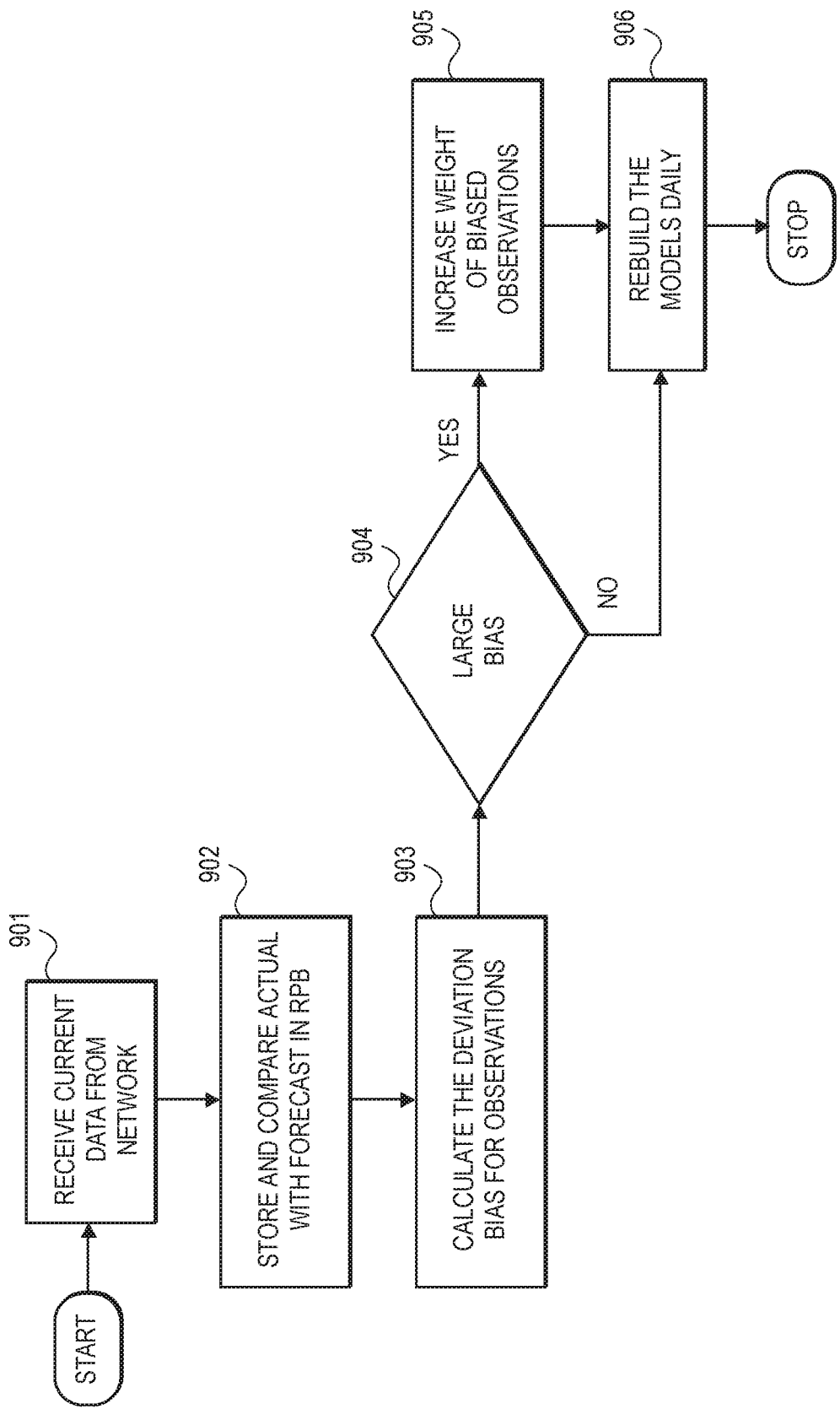
FIG. 9 is a flowchart of one example embodiment of an offline retraining process.

FIG. 9 is a flowchart of one example embodiment of an offline retraining process. The example retraining function is provided by way of example and not limitation, and one skilled in the art would understand that other similar retraining functions can be utilized in conjunction with the online and offline processes. The retraining function enriches the offline modeling with relevant validation responses. The retraining process can be initiated in response to receiving current driving experience data from an ADF (e.g., through API call of the CP) (Block 901). The experience data is stored by and accessible to the RPB for back testing and historical comparison with main KPI's dynamics (Block 902). The received experience data indicates actual QoS experience that is compared with the predicted QoS from the offline model. The QoS experience data and the predicted QoS data can be expressed as SLI levels, KPIs, and similar metrics on a per segment, per route, per location, per mobile communication network component or similar basis. Based on the comparison, a deviation between actual values and predicted indirect indicators (e.g., SLI levels and KPI values) is calculated (Block 903). A check is made of the deviation to determine whether there is a large bias (Block 904), wherein if the bias is large then observations receive a weight increase according to the deviation values (Block 905) and full historical data with adjusted observation weights can be rebuilt by the corresponding offline process at regular intervals (e.g., daily) (Block 906). If a large bias is not detected, then the weighting may not be adjusted and the offline process can rebuild the offline model at regular intervals (e.g., daily).

Figure 10:
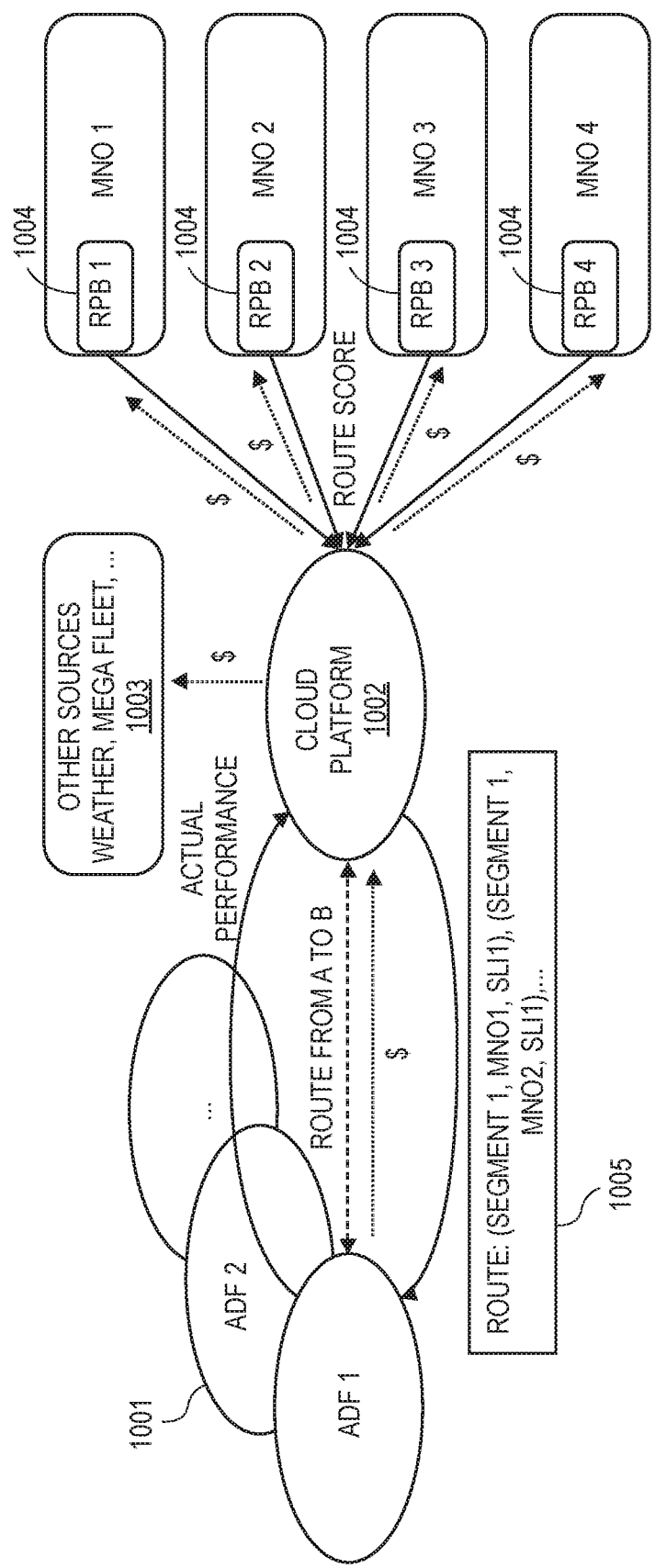
FIG. 10 is a diagram of one embodiment of a system for brokering information between multiple Mobile Network Operator (MNO) sources.

FIG. 10 is a diagram of one embodiment of a system for brokering information between multiple MNO sources. The illustrated brokering system demonstrates a high-level view of the data sources and the brokering process. The functions of the brokering process are further described with relation to FIGS. 11-13. In particular, the function described with relation to FIGS. 11-13 illustrate how the prediction system and services can be distributed such that proprietary information of each MNO is protected and thereby enable the brokering of the needed information that is to be shared by the MNOs with the prediction system and services.

In FIG. 10, the ADF 1001 receive prediction information (e.g., predicted QoS information for segments) 1005 in response to queries to the prediction system for a specified route. As a result of the prediction system processes there is a monetary accounting flow between the requesting ADFs 1001 and the prediction system and prediction services. The prediction information can be provided via the CP 1002 using multiple data sources. The primary data source (e.g., mobile communication network metric information) can be the MNOs which provide their live data and help maintain the ecosystem for the RPB 1004 located with or associated with the respective MNO. The RPBs 1004 can be a service provided by the prediction system and managed by an operator of the prediction service. This creates a monetary accounting flow between the prediction system and service at the CP and the RPBs at the respective MNOs based on the number of requests for mobile communication network data sent to the respective MNO. There can also be other third-party data sources 1003, which provide weather, traffic, best routes, DTM, and similar information for the prediction system and services, wherein this relationship creates a monetary accounting flow between the prediction system and prediction service and each of the third party sources depending on the number of requests for the respective third-party services. In one example embodiment, the prediction system and service are implemented on an Open Cloud Platform 1002 or similar platform, which creates a monetary accounting flow between the prediction system and service and the CP provider. This set of monetary accounting relationships is handled by a set of brokering functions that handle the accounting of charges between the inter-related components and systems.

Figure 11:
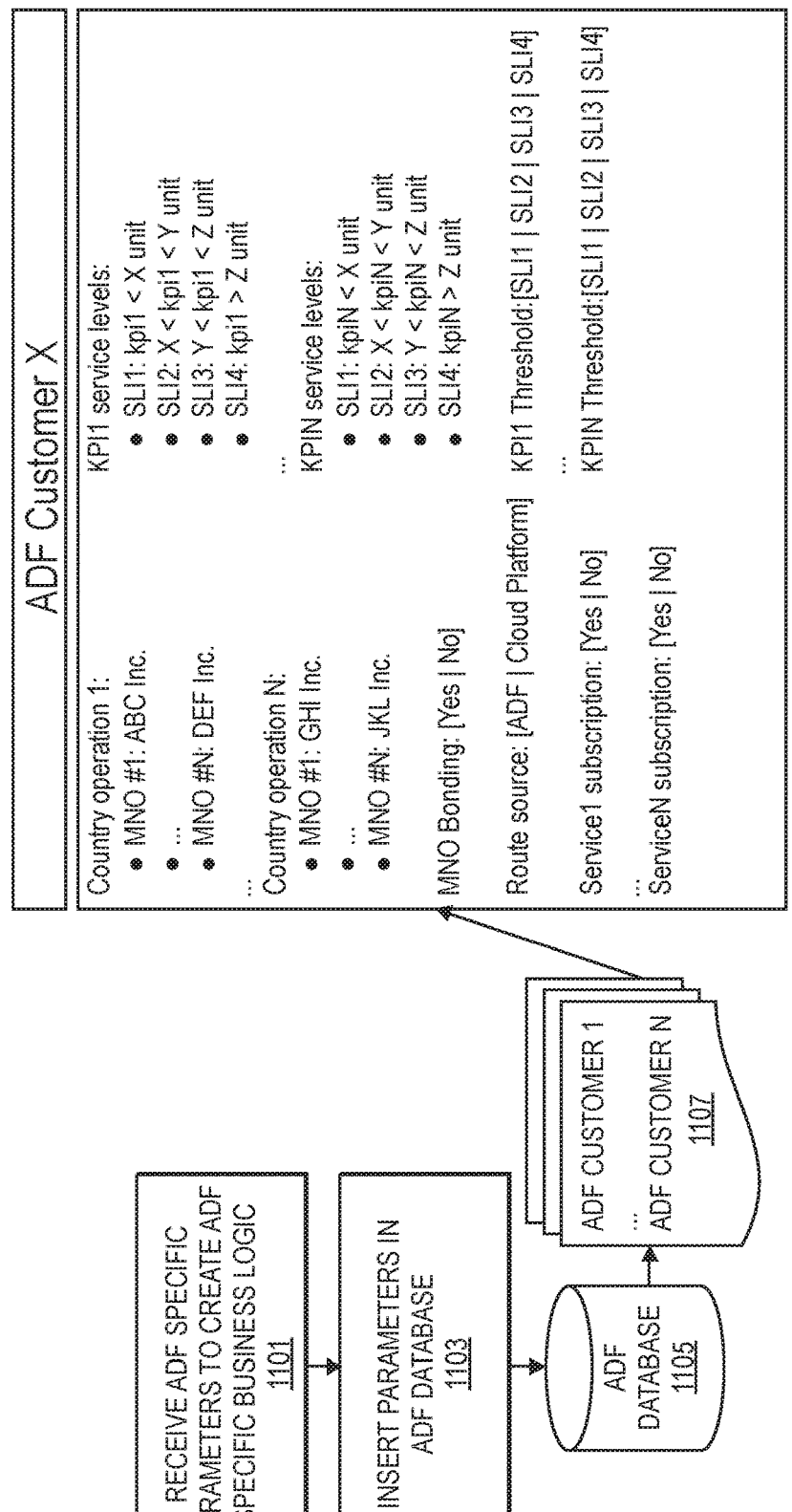
FIG. 11 is a flowchart of one embodiment of the process of integrating an Autonomous Driving Fleet (ADF) with the prediction system.

FIG. 11 is a flowchart of one embodiment of the process of integrating an ADF with the prediction system. The process includes the tracking of information relevant to each ADF and the autonomous vehicles (e.g., ADV) that make up the ADF. The process can be implemented by the prediction system and services at the CP and can be initiated by receiving ADF specific parameters to create ADF specific business logic (Block 1101). The received parameters are stored in an ADF database 1105 (Block 1103). The ADF database 1105 can include any number of records 1107 that provide parameters relevant to each ADF such as country of operation, KPI to SLI level mappings, KPI thresholds, subscription information and similar parameters.

Figure 12:
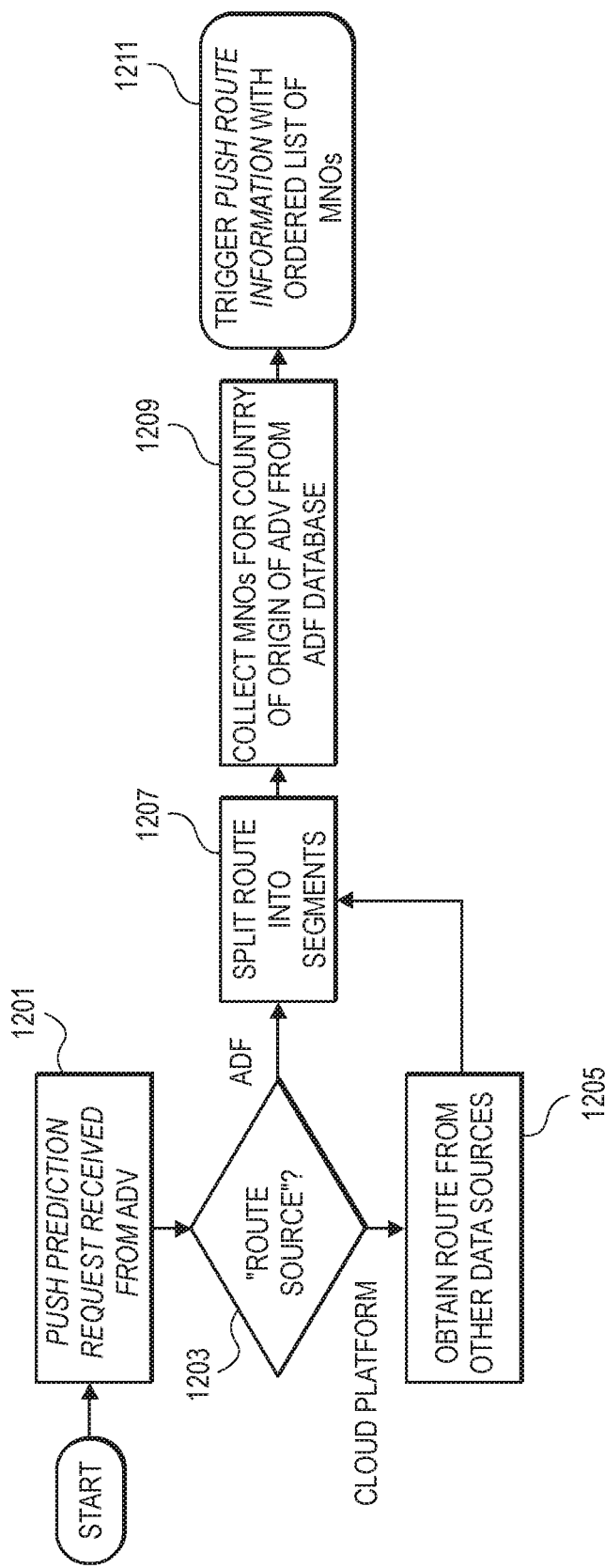
FIG. 12 is a flowchart of one embodiment of the online process implemented at a cloud platform (CP) to support information brokering.

FIG. 12 is a flowchart of one embodiment of the online process implemented at a CP to support information brokering. The process handles prediction requests at the CP for the prediction system and services. The example prediction request handling function is provided by way of example and not limitation, and one skilled in the art would understand that other similar prediction request handling functions can be utilized in conjunction with the online scoring process. The prediction request handling process can be initiated in response to receiving a 'push' prediction request or similar prediction request from an autonomous vehicle (e.g., ADV) of an associated ADF (Block 1201). A check is made whether the source of the route is to be determined by a third-party data source or provided by the autonomous vehicle (Block 1203). Where the route is to be sourced from a third-party or other data source (e.g., the autonomous vehicle provides only a destination and starting location that requires routing at the CP or external service), then the route is determined based on the available data from the request using a CP service or external service (Block 1205).

Where the autonomous vehicle provides a route or after it is determined, the route is split into segments (Block 1207). Any process or function can be used to identify segments including correlation with mobile communication network component locations, coverage maps, or similar techniques. Available MNOs (e.g., local mobile communication networks) for the country of origin for the autonomous vehicle and in some cases preferred providers can be determined using parameters stored in the ADF database (Block 1209). For example, the ADF database can be queried for the MNOs a given ADF or autonomous vehicle utilizes in a given country. Route information including segment identification can then be forwarded ('pushed') to each of the RPBs of respective MNOs that are identified based on an ordered list of MNOs (Block 1211).

Figure 13A:
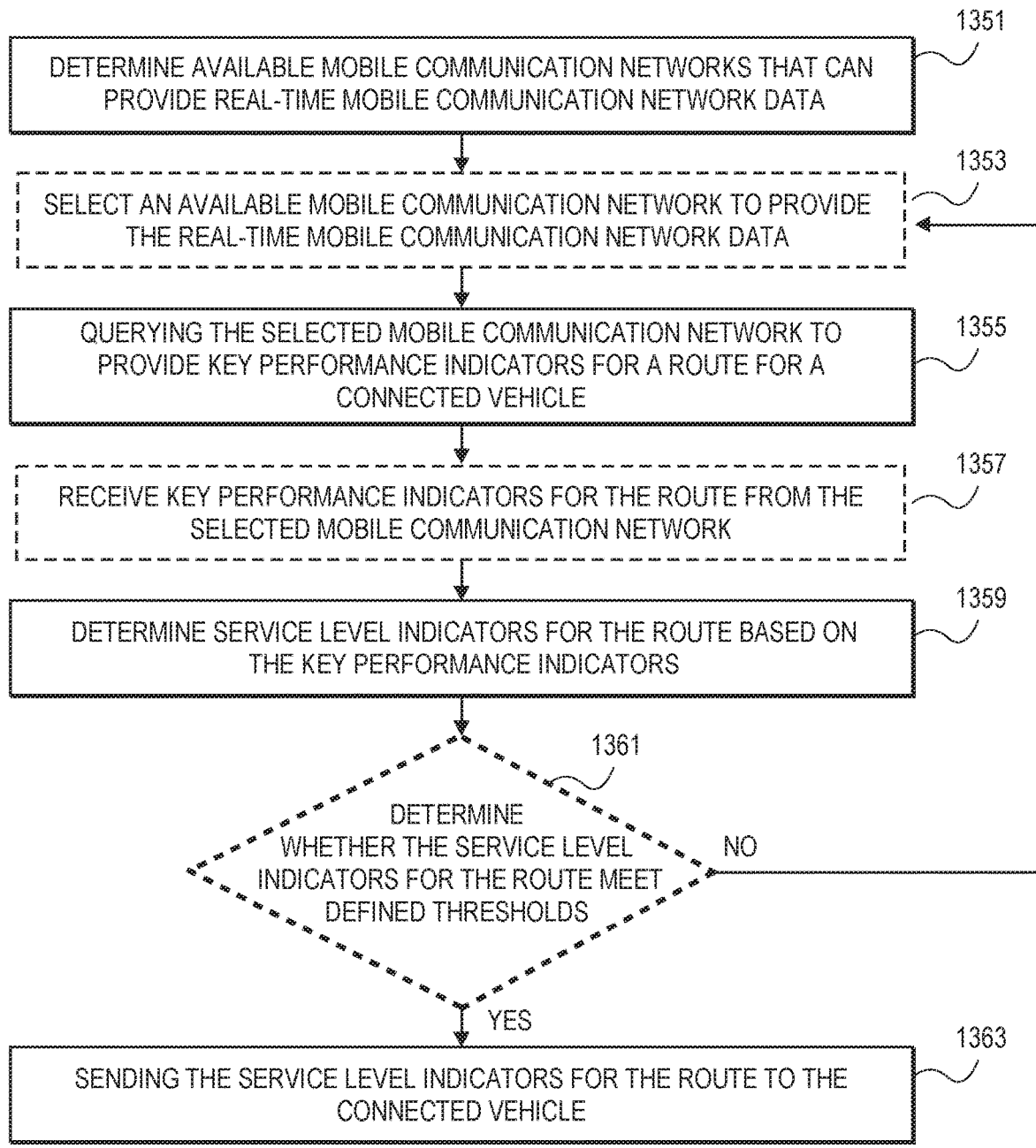
FIG. 13A is a flowchart of one embodiment of a process for prediction service at the CP that supports information brokering.

FIG. 13A is a flowchart of one embodiment of a process for prediction service at the CP that supports information brokering. The embodiment of the process can be implemented by a prediction service of a prediction system in communication with RPBs (e.g., AVRs) of each MNO (e.g., as illustrated in FIG. 10). The process is provided by way of example and not limitation. A more detailed example embodiment is described herein below with reference to FIG. 13B.

In one embodiment, the process of the prediction service to support information brokering can be initiated to predict a best route with a best QoS for a connected vehicle, where the connected vehicle has provided route information. The prediction service responds by determining available mobile communication networks that can provide real-time mobile communication network data that can be utilized for the prediction of QoS (Block 1351). The prediction service can select one of the available mobile communication networks to provide the real-time mobile communication network data for that network (Block 1353). Any method for selecting the mobile communication network can be selected, including using an ordered list of mobile communication networks or similar process.

The selected mobile communication network can then be queried to provide key performance indicators for the provided route for a connected vehicle (Block 1355). The query can use any communication protocol or process to obtain the information and can send any subset of the route information to obtain the requested real-time mobile communication network data. The prediction service can receive a set of key performance indicators for the route from the selected mobile communication network (Block 1357). Any number of key performance indicators and/or related data can be provided to the prediction service in response to the query. In some embodiments, each available mobile communication network is queried in parallel for key performance indicators or predicted service level indicators. Based on the provided key performance indicators a set of service level indicators for the route can be determined (Block 1359). The key performance indicators can be mapped or transformed into the service level indicators and can be determined by thresholds or similar mappings. Separate service level indicators can be generated for each key performance indicator provided.

The prediction service can determine whether the determined service level indicators meet defined thresholds (Block 1361). The defined thresholds can indicate acceptable or optimal QoS for a route based on the service level indicators. If the service level indicators do not meet the threshold levels or similar criteria then a next available mobile communication network can be selected and queried (Blocks 1353 and 1355). If the service level indicators do meet thresholds or meet specified criteria, then the service level indicator information for the route can be sent to (or toward, via the cloud platform) the connected vehicle that initiated the process (Block 1363).

Figure 13B:
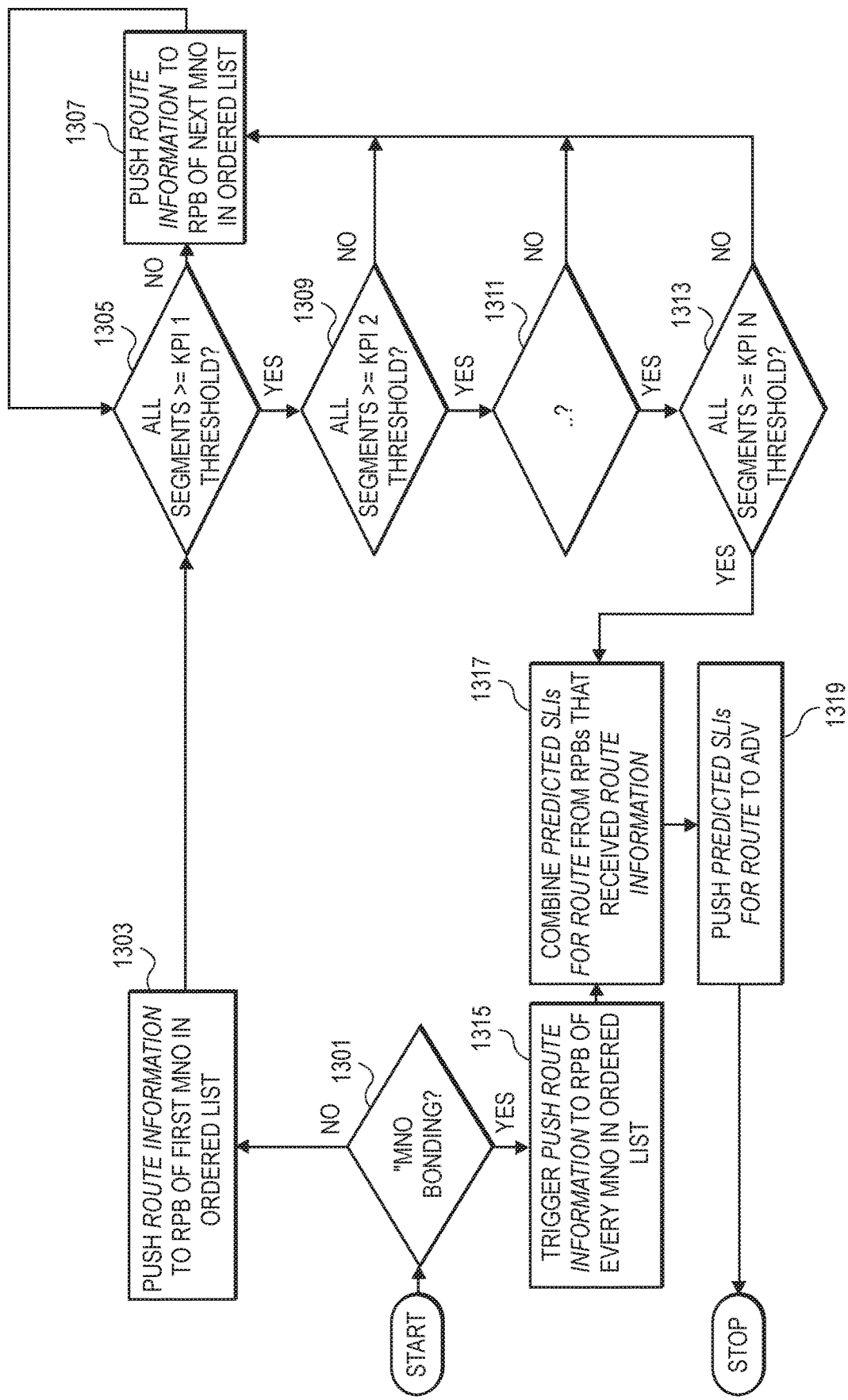
FIG. 13B is a flowchart of one example embodiment of a process for handling route information at a CP for the prediction system and service to support information brokering.

FIG. 13B is a flowchart of one example embodiment of a process for handling route information at a CP for the prediction system and service to support information brokering. The example push route function is provided by way of example and not limitation, and one skilled in the art would understand that other similar push route functions can be utilized in conjunction with the online scoring processes. The push route process can be initiated where a prediction request is received by determining whether MNO bonding has occurred (i.e., whether an ADV uses MNO bonding) (Block 1301). An ADV using MNO bonding will access multiple MNOs simultaneously, while an ADV not using MNO bonding will use a single MNO at a time although it may switch between MNOs depending on the predictions provided by the prediction system. Where there is no MNO bonding, the push route process sends route information to the RPB of the first MNO in the ordered list (Block 1303). A check is made whether all segments have a first KPI value above a designated threshold (e.g., as defined in the ADF parameters) (Block 1305). If all of the segments do not have a first KPI value above the threshold, then the route information is sent to the next MNO in the ordered list (Block 1307). Similar checks are made of additional KPI values (Block 1309-1313), until it is found that all of the KPI values are above the respective threshold or the route information is sent to the RPB of the next MNO in the ordered list.

If all segments of the route have KPI values above the respective thresholds, then the process combines the predicted SLIs for the route from the RPBs that received the route information (Block 1317). The combined predicted SLIs are then sent ('pushed') to the requesting ADV (Block 1319). Similarly, if there is MNO bonding (Block 1301), then a push of the route information to the RPB of each MNO in the ordered list is performed (Block 1315). The process then combines the predicted SLIs for the route from the RPBs that received the route information (Block 1317). The combined predicted SLIs are then sent ('pushed') to the requesting ADV (Block 1319).

Figure 14:
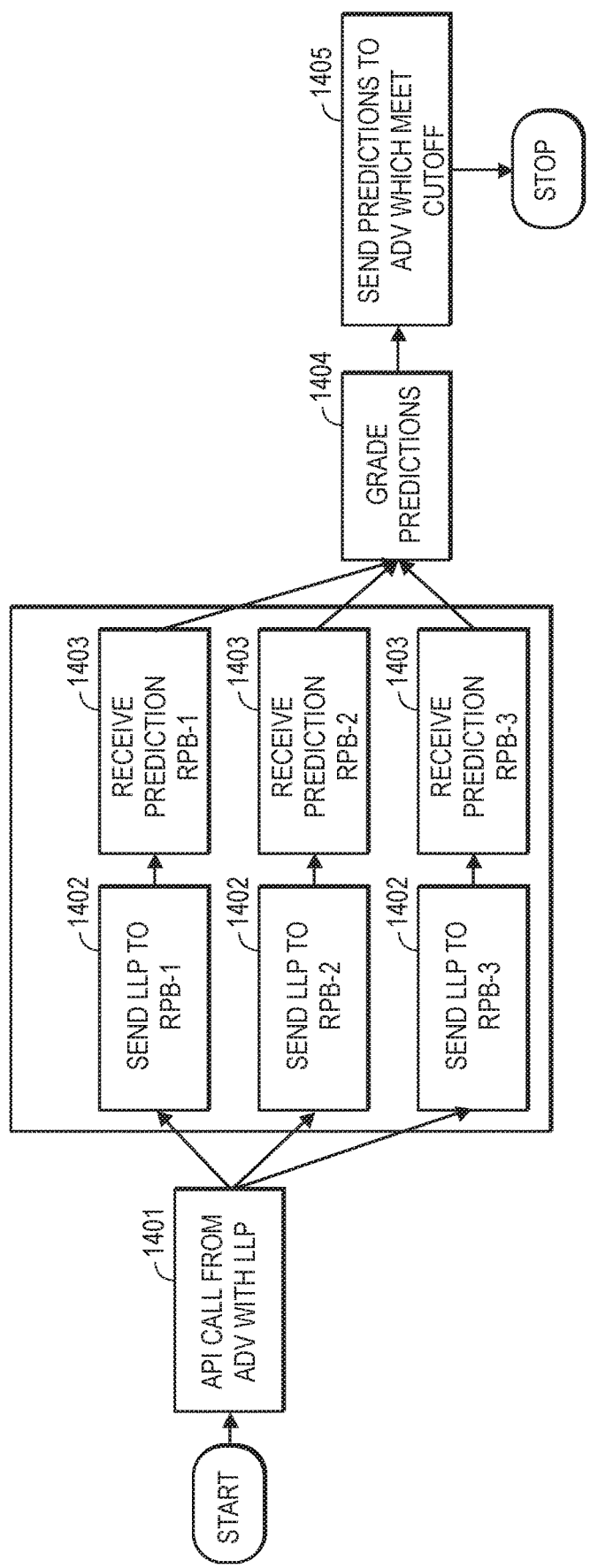
FIG. 14 is a diagram of one embodiment of a cloud implementation of the prediction system and service.

FIG. 14 is a diagram of one embodiment of a cloud implementation of the prediction system and service. FIG. 14 describes the flow of online scoring processing in the cloud implementation. The embodiments utilize a cloud platform to receive and send data from ADVs 1401, 1405. The embodiments are containerized and partially sit on the cloud platform making it easily scalable leading to a distributed system. Moreover, the other components of the prediction system and services can run in a distributed manner (including all the offline modeling, online and offline processes and similar components) on the RPB 1402, 1403. The entire end to end flow can use rest API's which leads to a system which is distributed and scalable not only vertically but horizontally as well. The data flow from ADV 1401 is sent to the RPB using APIs 1402, which are then worked upon and predictions added and sent back from the RPB 1403. Since feedback is handled in a loop, the predictions are received at the ADV, which in turn provides experience data. The experience data is used to grade predictions 1404 that are sent out to the corresponding ADV 1405, closing the data loop.

Figure 15A:
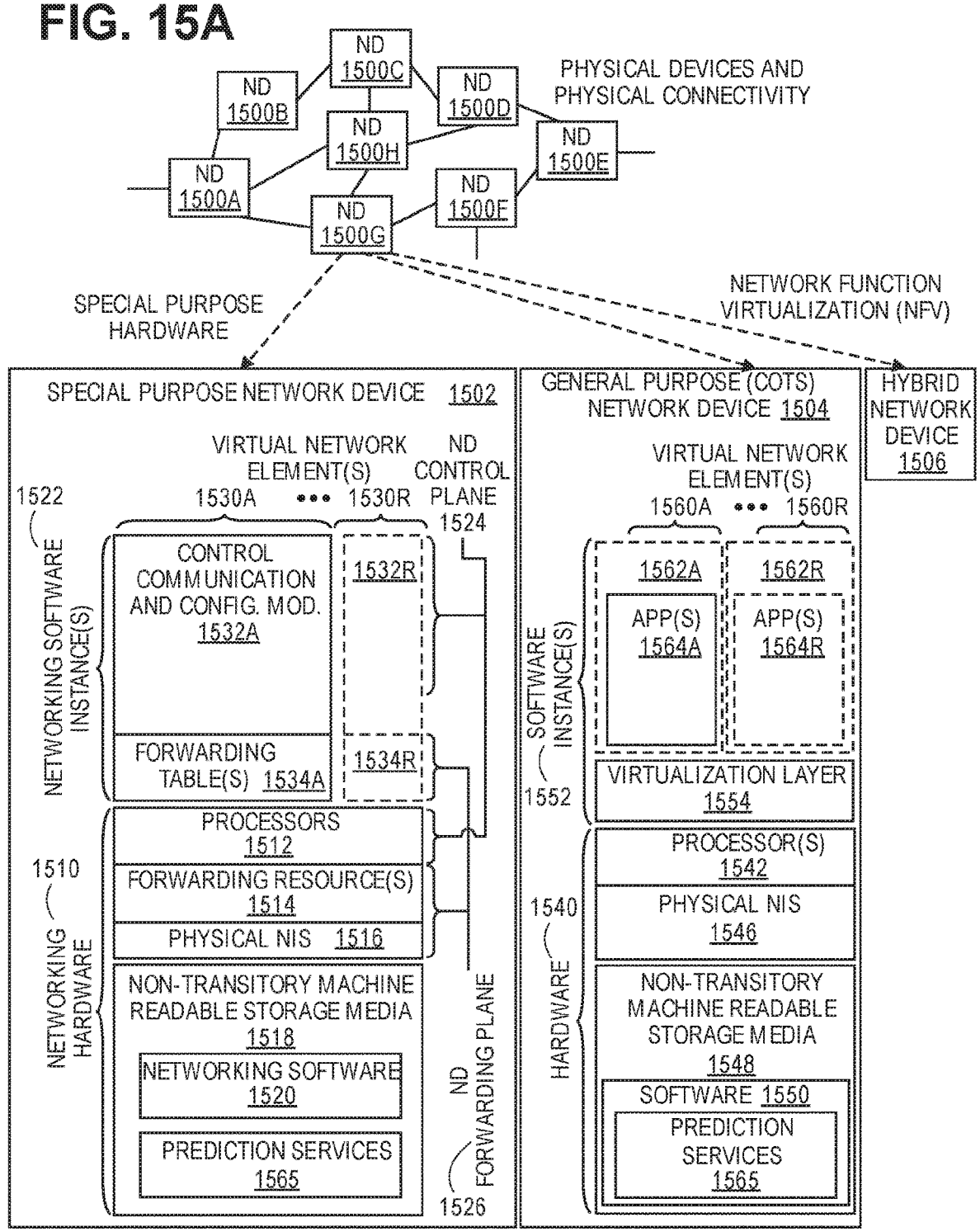
FIG. 15A illustrates connectivity between network devices (NDs) within an exemplary network, as well as three exemplary implementations of the NDs, according to some embodiments of the invention.

FIG. 15A illustrates connectivity between network devices (NDs) within an exemplary network, as well as three exemplary implementations of the NDs, according to some embodiments of the invention. FIG. 15A shows NDs 1500A-H, and their connectivity by way of lines between 1500A-1500B, 1500B-1500C, 1500C-1500D, 1500D-1500E, 1500E-1500F, 1500F-1500G, and 1500A-1500G, as well as between 1500H and each of 1500A, 1500C, 1500D, and 1500G. These NDs are physical devices, and the connectivity between these NDs can be wireless or wired (often referred to as a link). An additional line extending from NDs 1500A, 1500E, and 1500F illustrates that these NDs act as ingress and egress points for the network (and thus, these NDs are sometimes referred to as edge NDs; while the other NDs may be called core NDs).

Two of the exemplary ND implementations in FIG. 15A are: 1) a special-purpose network device 1502 that uses custom application—specific integrated-circuits (ASICs) and a special-purpose operating system (OS); and 2) a general purpose network device 1504 that uses common off-the-shelf (COTS) processors and a standard OS.

The special-purpose network device 1502 includes networking hardware 1510 comprising a set of one or more processor(s) 1512, forwarding resource(s) 1514 (which typically include one or more ASICs and/or network processors), and physical network interfaces (NIs) 1516 (through which network connections are made, such as those shown by the connectivity between NDs 1500A-H), as well as non-transitory machine readable storage media 1518 having stored therein networking software 1520. During operation, the networking software 1520 may be executed by the networking hardware 1510 to instantiate a set of one or more networking software instance(s) 1522. Each of the networking software instance(s) 1522, and that part of the networking hardware 1510 that executes that network software instance (be it hardware dedicated to that networking software instance and/or time slices of hardware temporally shared by that networking software instance with others of the networking software instance(s) 1522), form a separate virtual network element 1530A-R. Each of the virtual network element(s) (VNEs) 1530A-R includes a control communication and configuration module 1532A-R (sometimes referred to as a local control module or control communication module) and forwarding table(s) 1534A-R, such that a given virtual network element (e.g., 1530A) includes the control communication and configuration module (e.g., 1532A), a set of one or more forwarding table(s) (e.g., 1534A), and that portion of the networking hardware 1510 that executes the virtual network element (e.g., 1530A).

The non-transitory machine readable storage media 1518 can also have stored therein prediction services 1565. The prediction services 1565 can include any number or combinations of functions related to the prediction system described herein. The prediction services 1565 can distributed across multiple special purpose network devices 1502 as well as other devices.

The special-purpose network device 1502 is often physically and/or logically considered to include: 1) a ND control plane 1524 (sometimes referred to as a control plane) comprising the processor(s) 1512 that execute the control communication and configuration module(s) 1532A-R; and 2) a ND forwarding plane 1526 (sometimes referred to as a forwarding plane, a data plane, or a media plane) comprising the forwarding resource(s) 1514 that utilize the forwarding table(s) 1534A-R and the physical NIs 1516. By way of example, where the ND is a router (or is implementing routing functionality), the ND control plane 1524 (the processor(s) 1512 executing the control communication and configuration module(s) 1532A-R) is typically responsible for participating in controlling how data (e.g., packets) is to be routed (e.g., the next hop for the data and the outgoing physical NI for that data) and storing that routing information in the forwarding table(s) 1534A-R, and the ND forwarding plane 1526 is responsible for receiving that data on the physical NIs 1516 and forwarding that data out the appropriate ones of the physical NIs 1516 based on the forwarding table(s) 1534A-R.

Figure 15B:
FIG. 15B illustrates an exemplary way to implement a special-purpose network device according to some embodiments of the invention.

FIG. 15B illustrates an exemplary way to implement the special-purpose network device 1502 according to some embodiments of the invention. FIG. 15B shows a special-purpose network device including cards 1538 (typically hot pluggable). While in some embodiments the cards 1538 are of two types (one or more that operate as the ND forwarding plane 1526 (sometimes called line cards), and one or more that operate to implement the ND control plane 1524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1536 (e.g., a first full mesh coupling the line cards and a second full mesh coupling all of the cards).

Returning to FIG. 15A, the general purpose network device 1504 includes hardware 1540 comprising a set of one or more processor(s) 1542 (which are often COTS processors) and physical NIs 1546, as well as non-transitory machine readable storage media 1548 having stored therein software 1550. During operation, the processor(s) 1542 execute the software 1550 to instantiate one or more sets of one or more applications 1564A-R. While one embodiment does not implement virtualization, alternative embodiments may use different forms of virtualization. For example, in one such alternative embodiment the virtualization layer 1554 represents the kernel of an operating system (or a shim executing on a base operating system) that allows for the creation of multiple instances 1562A-R called software containers that may each be used to execute one (or more) of the sets of applications 1564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1554 represents a hypervisor (sometimes referred to as a virtual machine monitor (VMM)) or a hypervisor executing on top of a host operating system, and each of the sets of applications 1564A-R is run on top of a guest operating system within an instance 1562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1540, directly on a hypervisor (in which case the unikernel is sometimes described as running within a LibOS virtual machine), or in a software container, embodiments can be implemented fully with unikernels running directly on a hypervisor represented by virtualization layer 1554, unikernels running within software containers represented by instances 1562A-R, or as a combination of unikernels and the above-described techniques (e.g., unikernels and virtual machines both run directly on a hypervisor, unikernels and sets of applications that are run in different software containers).

The non-transitory machine readable storage media 1548 can also have stored therein prediction services 1565. The prediction services 1565 can include any number or combinations of functions related to the prediction system described herein. The prediction services 1565 can distributed across multiple general purpose network device 1504 as well as other devices. Similarly, the prediction services 1565 can be implemented in any number of general purpose electronic devices such as in a cloud computing environment that is in communication with a mobile communication network.

The instantiation of the one or more sets of one or more applications 1564A-R, as well as virtualization if implemented, are collectively referred to as software instance(s) 1552. Each set of applications 1564A-R, corresponding virtualization construct (e.g., instance 1562A-R) if implemented, and that part of the hardware 1540 that executes them (be it hardware dedicated to that execution and/or time slices of hardware temporally shared), forms a separate virtual network element(s) 1560A-R.

The virtual network element(s) 1560A-R perform similar functionality to the virtual network element(s) 1530A-R— e.g., similar to the control communication and configuration module(s) 1532A and forwarding table(s) 1534A (this virtualization of the hardware 1540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE).

While embodiments of the invention are illustrated with each instance 1562A-R corresponding to one VNE 1560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1562A-R to VNEs also apply to embodiments where such a finer level of granularity and/or unikernels are used.

In certain embodiments, the virtualization layer 1554 includes a virtual switch that provides similar forwarding services as a physical Ethernet switch. Specifically, this virtual switch forwards traffic between instances 1562A-R and the physical NI(s) 1546, as well as optionally between the instances 1562A-R; in addition, this virtual switch may enforce network isolation between the VNEs 1560A-R that by policy are not permitted to communicate with each other (e.g., by honoring virtual local area networks (VLANs)).

The third exemplary ND implementation in FIG. 15A is a hybrid network device 1506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1502) could provide for para-virtualization to the networking hardware present in the hybrid network device 1506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1530A-R, VNEs 1560A-R, and those in the hybrid network device 1506) receives data on the physical NIs (e.g., 1516, 1546) and forwards that data out the appropriate ones of the physical NIs (e.g., 1516, 1546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 15C:
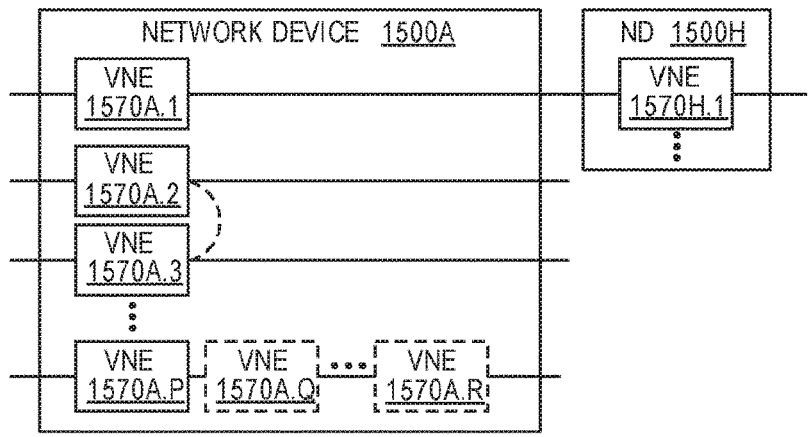
FIG. 15C illustrates various exemplary ways in which virtual network elements (VNEs) may be coupled according to some embodiments of the invention.

FIG. 15C illustrates various exemplary ways in which VNEs may be coupled according to some embodiments of the invention. FIG. 15C shows VNEs 1570A.1-1570A.P (and optionally VNEs 1570A.Q-1570A.R) implemented in ND 1500A and VNE 1570H.1 in ND 1500H. In FIG. 15C, VNEs 1570A.1-P are separate from each other in the sense that they can receive packets from outside ND 1500A and forward packets outside of ND 1500A; VNE 1570A.1 is coupled with VNE 1570H.1, and thus they communicate packets between their respective NDs; VNE 1570A.2-1570A.3 may optionally forward packets between themselves without forwarding them outside of the ND 1500A; and VNE 1570A.P may optionally be the first in a chain of VNEs that includes VNE 1570A.Q followed by VNE 1570A.R (this is sometimes referred to as dynamic service chaining, where each of the VNEs in the series of VNEs provides a different service—e.g., one or more layer 4-7 network services). While FIG. 15C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 15A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 15A may also host one or more such servers (e.g., in the case of the general purpose network device 1504, one or more of the software instances 1562A-R may operate as servers; the same would be true for the hybrid network device 1506; in the case of the special-purpose network device 1502, one or more such servers could also be run on a virtualization layer executed by the processor(s) 1512); in which case the servers are said to be co-located with the VNEs of that ND.

A virtual network is a logical abstraction of a physical network (such as that in FIG. 15A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPsec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 15D:
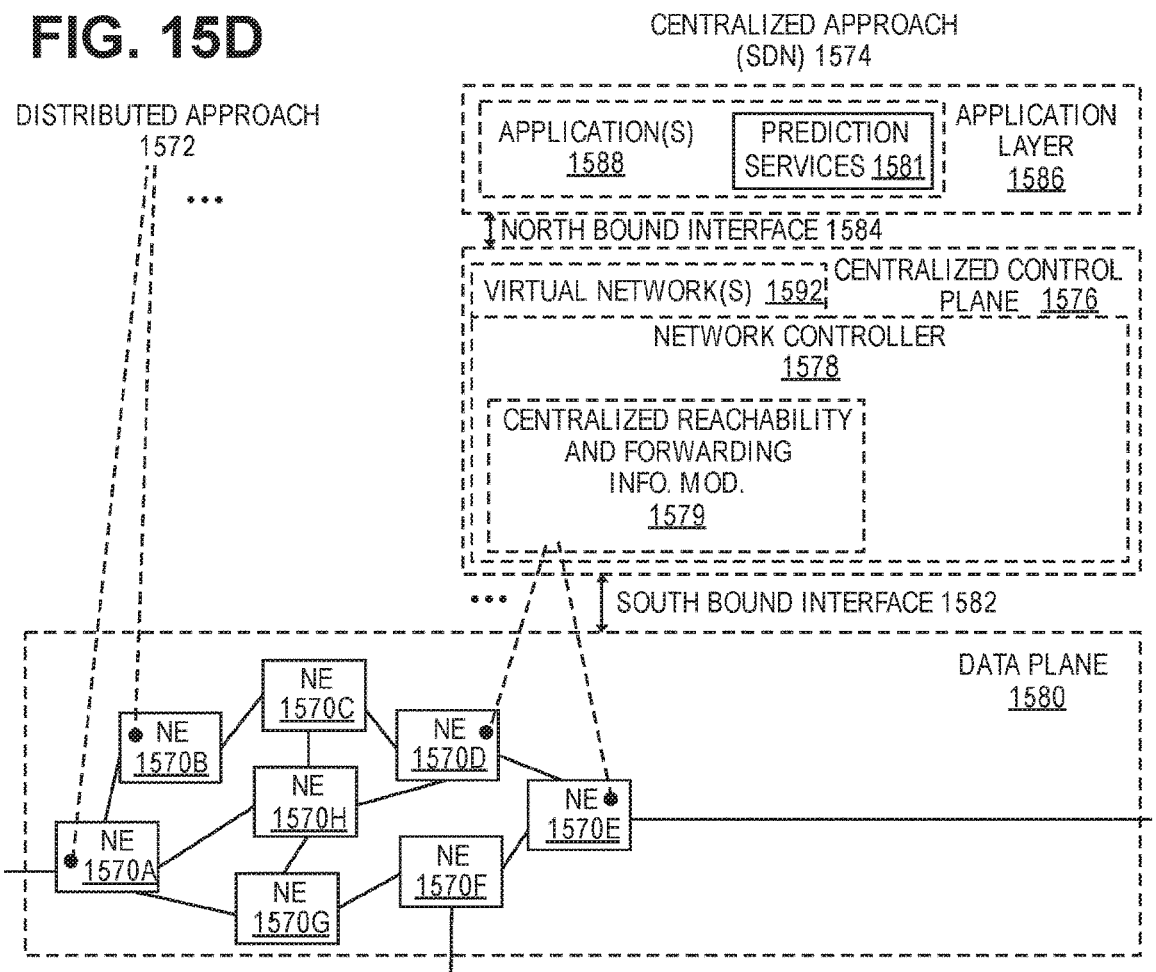
FIG. 15D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 15D illustrates a network with a single network element on each of the NDs of FIG. 15A, and within this straightforward approach contrasts a traditional distributed approach (commonly used by traditional routers) with a centralized approach for maintaining reachability and forwarding information (also called network control), according to some embodiments of the invention. Specifically, FIG. 15D illustrates network elements (NEs) 1570A-H with the same connectivity as the NDs 1500A-H of FIG. 15A.

FIG. 15D illustrates that the distributed approach 1572 distributes responsibility for generating the reachability and forwarding information across the NEs 1570A-H; in other words, the process of neighbor discovery and topology discovery is distributed.

For example, where the special-purpose network device 1502 is used, the control communication and configuration module(s) 1532A-R of the ND control plane 1524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1570A-H (e.g., the processor(s) 1512 executing the control communication and configuration module(s) 1532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1524.

The ND control plane 1524 programs the ND forwarding plane 1526 with information (e.g., adjacency and route information) based on the routing structure(s). For example, the ND control plane 1524 programs the adjacency and route information into one or more forwarding table(s) 1534A-R (e.g., Forwarding Information Base (FIB), Label Forwarding Information Base (LFIB), and one or more adjacency structures) on the ND forwarding plane 1526. For layer 2 forwarding, the ND can store one or more bridging tables that are used to forward data based on the layer 2 information in that data. While the above example uses the special-purpose network device 1502, the same distributed approach 1572 can be implemented on the general purpose network device 1504 and the hybrid network device 1506.

FIG. 15D illustrates that a centralized approach 1574 (also known as software defined networking (SDN)) that decouples the system that makes decisions about where traffic is sent from the underlying systems that forwards traffic to the selected destination. The illustrated centralized approach 1574 has the responsibility for the generation of reachability and forwarding information in a centralized control plane 1576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1576 has a south bound interface 1582 with a data plane 1580 (sometime referred to the infrastructure layer, network forwarding plane, or forwarding plane (which should not be confused with a ND forwarding plane)) that includes the NEs 1570A-H (sometimes referred to as switches, forwarding elements, data plane elements, or nodes). The centralized control plane 1576 includes a network controller 1578, which includes a centralized reachability and forwarding information module 1579 that determines the reachability within the network and distributes the forwarding information to the NEs 1570A-H of the data plane 1580 over the south bound interface 1582 (which may use the OpenFlow protocol). Thus, the network intelligence is centralized in the centralized control plane 1576 executing on electronic devices that are typically separate from the NDs.

For example, where the special-purpose network device 1502 is used in the data plane 1580, each of the control communication and configuration module(s) 1532A-R of the ND control plane 1524 typically include a control agent that provides the VNE side of the south bound interface 1582. In this case, the ND control plane 1524 (the processor(s) 1512 executing the control communication and configuration module(s) 1532A-R) performs its responsibility for participating in controlling how data (e.g., packets) is to be routed (e.g., the next hop for the data and the outgoing physical NI for that data) through the control agent communicating with the centralized control plane 1576 to receive the forwarding information (and in some cases, the reachability information) from the centralized reachability and forwarding information module 1579 (it should be understood that in some embodiments of the invention, the control communication and configuration module(s) 1532A-R, in addition to communicating with the centralized control plane 1576, may also play some role in determining reachability and/or calculating forwarding information—albeit less so than in the case of a distributed approach); such embodiments are generally considered to fall under the centralized approach 1574, but may also be considered a hybrid approach).

While the above example uses the special-purpose network device 1502, the same centralized approach 1574 can be implemented with the general purpose network device 1504 (e.g., each of the VNE 1560A-R performs its responsibility for controlling how data (e.g., packets) is to be routed (e.g., the next hop for the data and the outgoing physical NI for that data) by communicating with the centralized control plane 1576 to receive the forwarding information (and in some cases, the reachability information) from the centralized reachability and forwarding information module 1579; it should be understood that in some embodiments of the invention, the VNEs 1560A-R, in addition to communicating with the centralized control plane 1576, may also play some role in determining reachability and/or calculating forwarding information—albeit less so than in the case of a distributed approach) and the hybrid network device 1506. In fact, the use of SDN techniques can enhance the NFV techniques typically used in the general purpose network device 1504 or hybrid network device 1506 implementations as NFV is able to support SDN by providing an infrastructure upon which the SDN software can be run, and NFV and SDN both aim to make use of commodity server hardware and physical switches.

FIG. 15D also shows that the centralized control plane 1576 has a north bound interface 1584 to an application layer 1586, in which resides application(s) 1588. The centralized control plane 1576 has the ability to form virtual networks 1592 (sometimes referred to as a logical forwarding plane, network services, or overlay networks (with the NEs 1570A-H of the data plane 1580 being the underlay network)) for the application(s) 1588. Thus, the centralized control plane 1576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The prediction services 1581 can include any number or combinations of functions related to the prediction system described herein that are implemented at an application layer 1586.

While FIG. 15D shows the distributed approach 1572 separate from the centralized approach 1574, the effort of network control may be distributed differently or the two combined in certain embodiments of the invention. For example: 1) embodiments may generally use the centralized approach (SDN) 1574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1574, but may also be considered a hybrid approach.

While FIG. 15D illustrates the simple case where each of the NDs 1500A-H implements a single NE 1570A-H, it should be understood that the network control approaches described with reference to FIG. 15D also work for networks where one or more of the NDs 1500A-H implement multiple VNEs (e.g., VNEs 1530A-R, VNEs 1560A-R, those in the hybrid network device 1506). Alternatively or in addition, the network controller 1578 may also emulate the implementation of multiple VNEs in a single ND. Specifically, instead of (or in addition to) implementing multiple VNEs in a single ND, the network controller 1578 may present the implementation of a VNE/NE in a single ND as multiple VNEs in the virtual networks 1592 (all in the same one of the virtual network(s) 1592, each in different ones of the virtual network(s) 1592, or some combination). For example, the network controller 1578 may cause an ND to implement a single VNE (a NE) in the underlay network, and then logically divide up the resources of that NE within the centralized control plane 1576 to present different VNEs in the virtual network(s) 1592 (where these different VNEs in the overlay networks are sharing the resources of the single VNE/NE implementation on the ND in the underlay network).

Figure 15E:
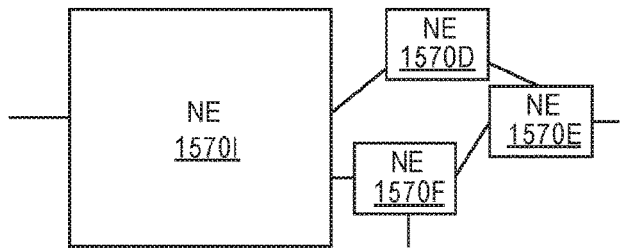
FIG. 15E illustrates the simple case of where each of the NDs implements a single NE, but a centralized control plane has abstracted multiple of the NEs in different NDs into (to represent) a single NE in one of the virtual network(s), according to some embodiments of the invention.
Figure 15F:
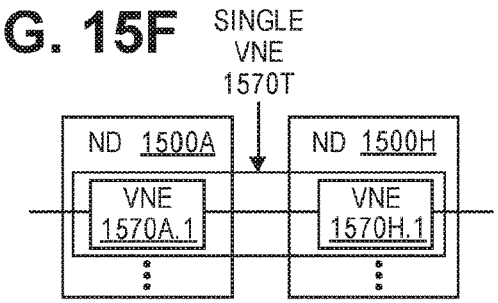
FIG. 15F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 15E and 15F respectively illustrate exemplary abstractions of NEs and VNEs that the network controller 1578 may present as part of different ones of the virtual networks 1592. FIG. 15E illustrates the simple case of where each of the NDs 1500A-H implements a single NE 1570A-H (see FIG. 15D), but the centralized control plane 1576 has abstracted multiple of the NEs in different NDs (the NEs 1570A-C and G-H) into (to represent) a single NE 15701 of the virtual network(s) 1592 of FIG. 15D, according to some embodiments of the invention. FIG. 15E shows that in this virtual network, the NE 15701 is coupled to NE 1570D and 1570F, which are both still coupled to NE 1570E.

FIG. 15F illustrates a case where multiple VNEs (VNE 1570A.1 and VNE 1570H.1) are implemented on different NDs (ND 1500A and ND 1500H) and are coupled to each other, and where the centralized control plane 1576 has abstracted these multiple VNEs such that they appear as a single VNE 1570T within one of the virtual networks 1592 of FIG. 15D, according to some embodiments of the invention. Thus, the abstraction of a NE or VNE can span multiple NDs.

While some embodiments of the invention implement the centralized control plane 1576 as a single entity (e.g., a single instance of software running on a single electronic device), alternative embodiments may spread the functionality across multiple entities for redundancy and/or scalability purposes (e.g., multiple instances of software running on different electronic devices).

Figure 16:
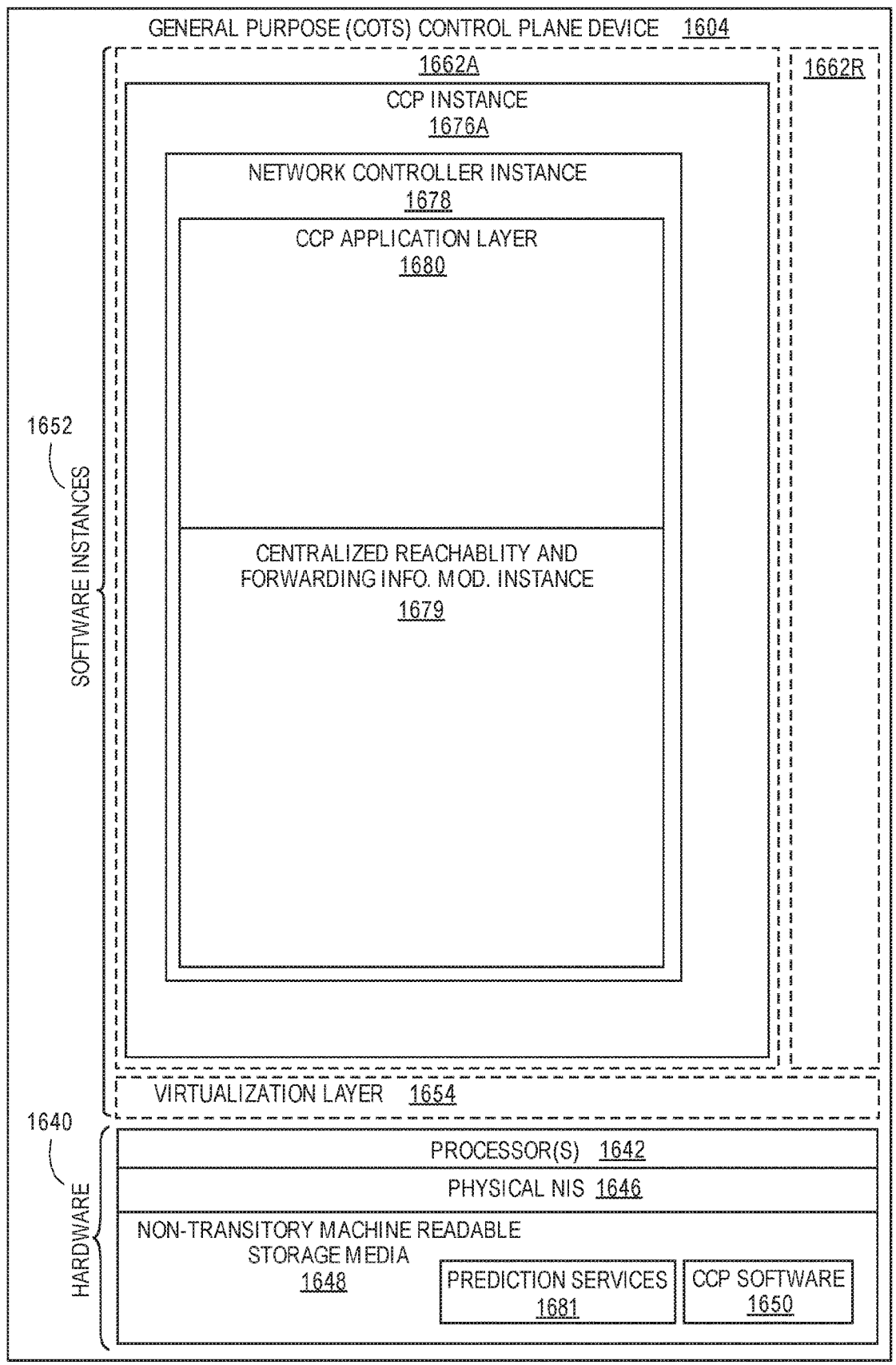
FIG. 16 illustrates a general purpose control plane device with centralized control plane (CCP) software 1650), according to some embodiments of the invention.

Similar to the network device implementations, the electronic device(s) running the centralized control plane 1576, and thus the network controller 1578 including the centralized reachability and forwarding information module 1579, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 16 illustrates, a general purpose control plane device 1604 including hardware 1640 comprising a set of one or more processor(s) 1642 (which are often COTS processors) and physical NIs 1646, as well as non-transitory machine readable storage media 1648 having stored therein centralized control plane (CCP) software 1650.

The non-transitory machine readable storage media 1648 can also have stored therein prediction services 1681. The prediction services 1681 can include any number or combinations of functions related to the prediction system described herein. The prediction services 1681 can distributed across multiple general purpose devices 1604 as well as other devices.

In embodiments that use compute virtualization, the processor(s) 1642 typically execute software to instantiate a virtualization layer 1654 (e.g., in one embodiment the virtualization layer 1654 represents the kernel of an operating system (or a shim executing on a base operating system) that allows for the creation of multiple instances 1662A-R called software containers (representing separate user spaces and also called virtualization engines, virtual private servers, or jails) that may each be used to execute a set of one or more applications; in another embodiment the virtualization layer 1654 represents a hypervisor (sometimes referred to as a virtual machine monitor (VMM)) or a hypervisor executing on top of a host operating system, and an application is run on top of a guest operating system within an instance 1662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1640, directly on a hypervisor represented by virtualization layer 1654 (in which case the unikernel is sometimes described as running within a LibOS virtual machine), or in a software container represented by one of instances 1662A-R). Again, in embodiments where compute virtualization is used, during operation an instance of the CCP software 1650 (illustrated as CCP instance 1676A) is executed (e.g., within the instance 1662A) on the virtualization layer 1654. In embodiments where compute virtualization is not used, the CCP instance 1676A is executed, as a unikernel or on top of a host operating system, on the "bare metal" general purpose control plane device 1604. The instantiation of the CCP instance 1676A, as well as the virtualization layer 1654 and instances 1662A-R if implemented, are collectively referred to as software instance(s) 1652.

In some embodiments, the CCP instance 1676A includes a network controller instance 1678. The network controller instance 1678 includes a centralized reachability and forwarding information module instance 1679 (which is a middleware layer providing the context of the network controller 1578 to the operating system and communicating with the various NEs), and an CCP application layer 1680 (sometimes referred to as an application layer) over the middleware layer (providing the intelligence required for various network operations such as protocols, network situational awareness, and user—interfaces). At a more abstract level, this CCP application layer 1680 within the centralized control plane 1576 works with virtual network view(s) (logical view(s) of the network) and the middleware layer provides the conversion from the virtual networks to the physical view.

The centralized control plane 1576 transmits relevant messages to the data plane 1580 based on CCP application layer 1680 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 1580 may receive different messages, and thus different forwarding information. The data plane 1580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1580, the packet (or a subset of the packet header and content) is typically forwarded to the centralized control plane 1576. The centralized control plane 1576 will then program forwarding table entries into the data plane 1580 to accommodate packets belonging to the flow of the unknown packet. Once a specific forwarding table entry has been programmed into the data plane 1580 by the centralized control plane 1576, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of providing route prediction to an autonomous vehicle connected to a brokered information prediction system, the method comprising:

determining available mobile communication networks that can provide real-time mobile communication network data related to route prediction for routing of the autonomous vehicle based on route information provided by the autonomous vehicle;

querying a first available mobile communication network to provide key performance indicators for a route to be taken by the autonomous vehicle based on the route information;

determining service level indicators for the route based on received key performance indicators for the route where the key performance indicators meet defined thresholds for the autonomous vehicle; and sending predicted service level indicators for the route to the autonomous vehicle.

2. The method of claim 1, further comprising:

querying a second available mobile communication network when the key performance indicators of the first available mobile communication network do not meet requirements of the autonomous vehicle.

3. The method of claim 1, further comprising:

determining whether each segment of the route meets a threshold for a first key performance indicator.

4. The method of claim 1, further comprising:

determining whether each segment of the route meets another threshold for a second key performance indicator.

5. The method of claim 1, further comprising:

determining whether the autonomous vehicle has performed mobile communication network operator (MNO) bonding.

6. The method of claim 1, further comprising:

querying each available mobile communication network in parallel for key performance indicators or predicted service level indicators.

7. The method of claim 1, further comprising:

combining predicted service level indicators for the route from each available mobile communication network.

8. The method of claim 1, wherein a route prediction block of each mobile communication network is queried for the key performance indicators.

9. An electronic device to implement a brokered information prediction system utilizing real-time mobile communication network data to provide route prediction to an autonomous vehicle connected to the brokered information prediction system, the electronic device comprising:

a non-transitory machine-readable storage medium having stored therein a prediction service; and a processor coupled to the non-transitory machine-readable storage medium, the processor to execute the prediction service, the prediction service to determine available mobile communication networks that can provide real-time mobile communication network data related to route prediction for routing of the autonomous vehicle based on route information provided by the autonomous vehicle, query a first available mobile communication network to provide key performance indicators for a route to be taken by the autonomous vehicle based on the route information, determine service level indicators for the route based on received key performance indicators for the route where the key performance indicators meet defined thresholds for the autonomous vehicle, and send predicted service level indicators for the route to the autonomous vehicle.

10. The electronic device of claim 9, wherein the prediction service is further to query a second available mobile communication network when the key performance indicators of the first available mobile communication network do not meet requirements of the autonomous vehicle.

11. The electronic device of claim 9, wherein the prediction service is further to determine whether each segment of the route meets a threshold for a first key performance indicator.

12. The electronic device of claim 9, wherein the prediction service is further to determine whether each segment of the route meets another threshold for a second key performance indicator.

13. A network device to implement a brokered information prediction system utilizing real-time mobile communication network data to provide route prediction to an autonomous vehicle connected to the brokered information prediction system, wherein the network device is to execute a plurality of virtual machines, the plurality of virtual machines implementing network function virtualization (NFV), the network device comprising:
  a non-transitory machine-readable storage medium having stored therein a prediction service; and
  a processor coupled to the non-transitory machine-readable storage medium, the processor to execute one of the plurality of virtual machines, the one of the plurality of virtual machines to execute the prediction service, the prediction service to determine available mobile communication networks that can provide real-time mobile communication network data related to route prediction for routing of the autonomous vehicle based on route information provided by the autonomous vehicle, query a first available mobile communication network to provide key performance indicators for a route to be taken by the autonomous vehicle based on the route information, determine service level indicators for the route based on received key performance indicators for the route where the key performance indicators meet defined thresholds for the autonomous vehicle, and send predicted service level indicators for the route to the autonomous vehicle.

14. The network device of claim 13, wherein the prediction service is further to query a second available mobile communication network when the key performance indicators of the first available mobile communication network do not meet requirements of the autonomous vehicle.

15. The network device of claim 13, wherein the prediction service is further to determine whether each segment of the route meets a threshold for a first key performance indicator.

16. The network device of claim 13, wherein the prediction service is further to determine whether each segment of the route meets another threshold for a second key performance indicator.

17. A control plane device in a software defined network (SDN) network including a plurality of data plane devices, wherein the control plane device is to implement a brokered information prediction system utilizing real-time mobile communication network data to provide route prediction to an autonomous vehicle connected to the brokered information prediction system, the control plane device comprising:
  a non-transitory machine-readable storage medium having stored therein a prediction service; and
  a processor coupled to the non-transitory machine-readable storage medium, the processor to execute the prediction service, the prediction service to determine available mobile communication networks that can provide real-time mobile communication network data related to route prediction for routing of the autonomous vehicle based on route information provided by the autonomous vehicle, query a first available mobile communication network to provide key performance indicators for a route to be taken by the autonomous vehicle based on the route information, determine service level indicators for the route based on received key performance indicators for the route where the key performance indicators meet defined thresholds for the autonomous vehicle, and send predicted service level indicators for the route to the autonomous vehicle.

18. The control plane device of claim 17, wherein the prediction service is further to query a second available mobile communication network when the key performance indicators of the first available mobile communication network do not meet requirements of the autonomous vehicle.

19. The control plane device of claim 17, wherein the prediction service is further to determine whether each segment of the route meets a threshold for a first key performance indicator.

20. The control plane device of claim 17, wherein the prediction service is further to determine whether each segment of the route meets another threshold for a second key performance indicator.

* * * * *